US012680900B2

(12) United States Patent　　　　(10) Patent No.:　US 12,680,900 B2

Hattori et al.　　　　　　　　　　(45) Date of Patent:　　Jul. 14, 2026

(54) WHEEL LOAD ESTIMATION DEVICE, VEHICLE, PROGRAM, AND WHEEL LOAD ESTIMATION METHOD

(71) Applicant: KABUSHIKI KAISHA TOYOTA JIDOSHOKKI, Kariya (JP)

(72) Inventors: Tatsuya Hattori, Kariya (JP); Hiroyuki Yamaguchi, Nagakute (JP); Masateru Amano, Nagakute (JP); Yoshikazu Hattori, Nagakute (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 5 days.

(21) Appl. No.: 18/944,592

(22) Filed: Nov. 12, 2024

(65) Prior Publication Data

US 2025/0164335 A1　　May 22, 2025

(30) Foreign Application Priority Data

Nov. 17, 2023　(JP) .................................. 2023-196314

(51) Int. Cl.
　　*G01M 1/12*　　　(2006.01)
　　*G01P 15/18*　　　(2013.01)
　　*B66F 9/075*　　　(2006.01)
(52) U.S. Cl.
　　CPC ............. *G01M 1/122* (2013.01); *G01P 15/18* (2013.01); *B66F 9/07572* (2013.01)
(58) Field of Classification Search
　　CPC ..... G01M 1/122; G01P 15/18; B66F 9/07572; B66F 9/07559; B66F 17/003; B60W 2030/041; B60W 2050/0035; B60W 2300/12; B60W 2300/121; B60W 2420/905; B60W 2520/105; B60W 2520/125; B60W 2520/14; B60W 2530/10; B60W 40/13; B60W 2040/1307;

(Continued)

(56) References Cited

U.S. PATENT DOCUMENTS 6,138,066 A　　10/2000　Guo et al.
2011/0066322 A1　3/2011　Karlsson et al.

(Continued)

FOREIGN PATENT DOCUMENTS

EP　　4 230 972 A1　　8/2023
JP　　2002-515972 A　　5/2002

(Continued)

OTHER PUBLICATIONS

Communication issued Aug. 26, 2025 in Australian Application No. 2024264554.

(Continued)

*Primary Examiner* — Brodie J Follman

(74) *Attorney, Agent, or Firm* — Sughrue Mion, PLLC

(57)　　　　　ABSTRACT

A wheel load estimation device that estimates wheel load acting on wheels of a vehicle includes an acquisition unit, a calculation unit, and an estimation unit. The acquisition unit acquires detection value output from a sensor as a parameter. The parameter is a parameter related to a motion of the vehicle. The calculation unit calculates an inertial force generated in the vehicle based on the parameter and a mass of the vehicle. The estimation unit estimates the wheel load based on the inertial force and a predetermined estimation equation.

12 Claims, 24 Drawing Sheets

(58) Field of Classification Search
CPC ..... B60W 2040/1315; B60W 2520/16; B60W
2520/18; B60W 2520/28; B60W 2540/18
See application file for complete search history.

(56) References Cited

U.S. PATENT DOCUMENTS

| | | | |
|---|---|---|---|
| 2021/0395063 A1 | 12/2021 | Hattori | |
| 2022/0063366 A1 | 3/2022 | Minakuchi et al. | |
| 2023/0001749 A1* | 1/2023 | De Witte et al. | ..... B60C 23/061 |
| 2023/0373497 A1 | 11/2023 | Hattori et al. | |

FOREIGN PATENT DOCUMENTS

| | | | |
|---|---|---|---|
| JP | 2004-58960 A | 2/2004 |
| JP | 2020-93741 A | 6/2020 |
| WO | 2009/071104 A1 | 6/2009 |

OTHER PUBLICATIONS

Extended European Search Report Apr. 4, 2025 in Application No. 24212382.6.
Canadian Office Action dated Feb. 16, 2026, issued in Canadian application No. 3,253,617.

* cited by examiner

VEHICLE COORDINATE SYSTEM

GROUND COORDINATE SYSTEM

ATTITUDE ANGLE IN VEHICLE COORDINATE SYSTEM

GROUND COORDINATE SYSTEM

PRINCIPAL AXIS INERTIA

LOAD 602

PRINCIPAL AXIS INERTIA

LOAD 602

600

SIDE VIEW

PLAN VIEW

WHEEL LOAD ESTIMATION DEVICE, VEHICLE, PROGRAM, AND WHEEL LOAD ESTIMATION METHOD

CROSS-REFERENCE TO RELATED APPLICATION

This application claims priority to Japanese Patent Application No. 2023-196314 filed on Nov. 17, 2023, the entire disclosure of which is incorporated herein by reference.

The present disclosure relates to a wheel load estimation device, a vehicle, a program, and a wheel load estimation method.

BACKGROUND ART

Japanese Patent Publication No. 2011-505566 discloses a method for estimating a current load of a vehicle.

This method will be described. In this method, a filter bank includes filters for different weight classes, and each of the filters implements a vehicle model for estimating a current mass of a vehicle. Based on vehicle data indicative of a current driving situation of the vehicle, and filter parameters specific for the respective weight classes, each filter provides a load estimation value as a filter specific estimation value of the current load of the vehicle. In the above Publication, the following expression (1) is disclosed.

$$\dot{v} + g \cdot \sin \alpha / \gamma_m + g \cdot C_r \cdot \gamma_m \qquad (1)$$

Japanese Patent Publication No. 2002-515972 discloses a method for determining amounts indicative of a driving state of a vehicle.

This method will be described. In order to ensure stability in yaw torque control or good quality even with road lateral inclinations and/or with a rolling motion of the vehicle, lateral inclination identification is necessary. The lateral inclination identification is performed by calculating the lateral inclination angle $\alpha q$. When the lateral inclination is identified, a calculation device of the vehicle can be designed to generally counteract the lateral inclination. A calculation of the lateral inclination angle is made based on a coordinate transformation. A value detected by a lateral acceleration measurement device fixed to the vehicle is related to a value of the lateral acceleration relative to the Earth, which is calculated from another sensor signal, according to equation (2). The solution of this equation yields the lateral inclination angle.

$$a_{qm} = a_q \cdot \cos(\alpha_q) - g \cdot \sin(\alpha_q) \qquad (2)$$

However, the methods disclosed in the above Publications require complex calculations when estimating the wheel load.

In view of the above circumstances, the present disclosure provides a wheel load estimation device, a vehicle, a program, and a wheel load estimation method that can reduce the calculation load when a wheel load is estimated as compared to a conventional wheel load estimation device and the like.

SUMMARY

According to one aspect of the present disclosure, there is provided a wheel load estimation device that estimates a wheel load acting on a wheel of a vehicle, the wheel load estimation device including an acquisition unit; a calculation unit; and an estimation unit. The acquisition unit acquires a detection value output from a sensor as a parameter, the parameter is a parameter related to a motion of the vehicle, the calculation unit calculates an inertial force generated in the vehicle based on the parameter and a mass of the vehicle, and the estimation unit estimates the wheel load based on the inertial force and a predetermined estimation equation.

According to another aspect of the present disclosure, there is provided a vehicle including the wheel load estimation device; a determination unit; and a limiting unit. The wheel load estimation device outputs the estimated wheel load, the determination unit determines whether limiting a motion of the vehicle is necessary based on the estimated wheel load and reference information, the reference information is information indicating a relationship between the estimated wheel load and whether limiting the motion of the vehicle is necessary, and the limiting unit limits the motion of the vehicle when the determination unit determines that limiting the motion of the vehicle is necessary.

According to another aspect of the present disclosure, there is provided a program causing a computer to function as units of the wheel load estimation device.

According to another aspect of the present disclosure, there is provided a wheel load estimation method comprising processing, as steps, performed by units of the wheel load estimation device.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which:

FIGS. 7A and 7B are schematic conceptual diagrams illustrating a difference in principal axis inertia due to a difference in lifting height of a load 602;

DETAILED DESCRIPTION OF THE EMBODIMENTS

The following will describe embodiments of the present disclosure with reference to the drawings. Various features described in the following embodiments can be combined with each other. In addition, all the embodiments may be collectively referred to as the present embodiment.

It is noted that programs for realizing a software appearing in the present embodiment may be provided as a non-temporary computer-readable recording medium, may be provided so as to be downloadable from an external server, or may be provided so that programs are activated on an external computer and their functions are realized on a client terminal (so-called cloud computing).

In addition, in the present embodiment, the term "unit" may include, for example, a combination of hardware resources implemented by circuits in a broad sense and software information processing that can be specifically realized by these hardware resources. In addition, in the present embodiment, various pieces of information are dealt. These pieces of information are represented, for example, by physical values of signal values representing voltage and current, high and low signal values as a bit collection of binary consisting of 0 or 1, or quantum superposition (so-called quantum bits), and communication and calculations can be performed on a circuit in a broad sense.

In addition, the circuit in the broad sense corresponds to a circuit that is realized by at least appropriately combining a circuit, circuitry, a processor, a memory, and the like. That is, the circuit includes an Application Specific Integrated Circuit (ASIC), a programmable logic device (e.g., a Simple Programmable Logic Device (SPLD), a Complex Programmable Logic Device (CPLD), and a Field Programmable Gate Array (FPGA)), and the like.

First Embodiment

Firstly, a first embodiment of the present disclosure will be described.

Section 1. Hardware Configuration

In Section 1, a hardware configuration of the first embodiment will be described.

1-1 Vehicle 600

Figure 1:
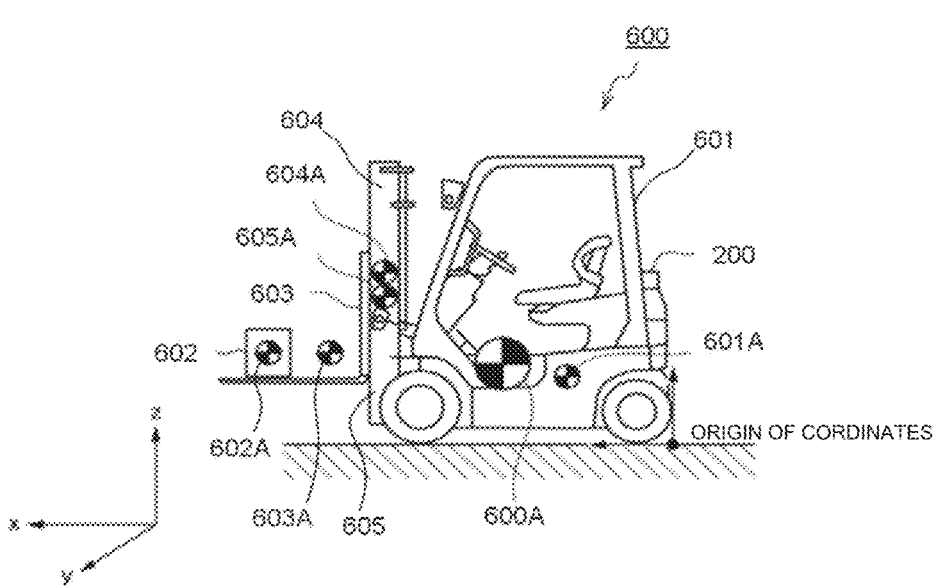
FIG. 1 is a schematic view illustrating a configuration of a vehicle 600.

FIG. 1 is a schematic view illustrating a configuration of a vehicle 600. The vehicle 600 includes a vehicle body 601, a load 602, a fork 603, an outer mast 604, and an inner mast 605. In FIG. 1, a mark indicating the center of gravity is shown at the center of gravity of each of component parts, an alphabet "A" is added to the end of each of reference numerals. A size of the circle indicating the center of gravity roughly represents a size of each of the component parts. In the following description, the vehicle 600 including the load 602 may be referred to as the "entire vehicle 600."

The vehicle 600 includes elements that cause variation in the center of gravity. The vehicle 600 travels with the load 602 on the fork 603 that is movable up and down. The vehicle 600 is a forklift truck having four wheels, specifically, left and right wheels in the front and the rear, and supported by each of the wheels. In the first embodiment, a case where a wheel load of each of the wheels is estimated will be described. In the first embodiment, it is assumed that a vehicle behavior including a longitudinal acceleration, a lateral acceleration, a roll angular velocity, a pitch angular velocity, and a yaw angular velocity of the vehicle 600 is measured. In the first embodiment, it is assumed that the mass of the load 602, a lifting height, and the loading position of the load 602 on the fork 603 can be detected.

Figure 2:
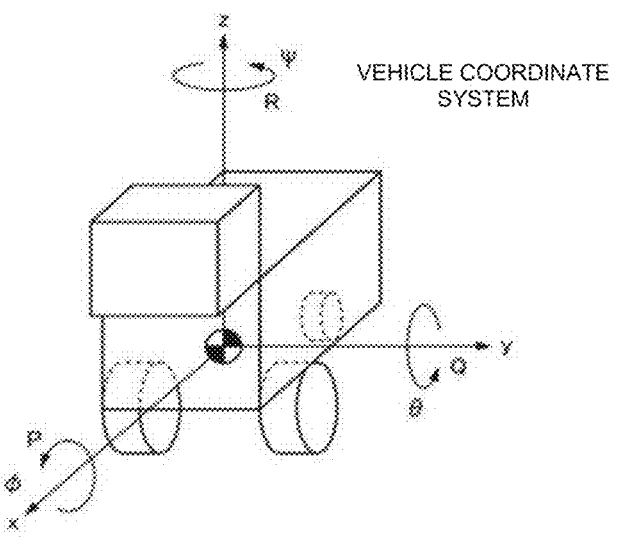
FIG. 2 is a view illustrating a vehicle coordinate system with respect to a ground coordinate system.
Figure 2:
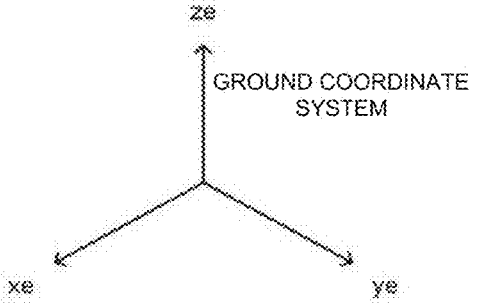
Figure 3:
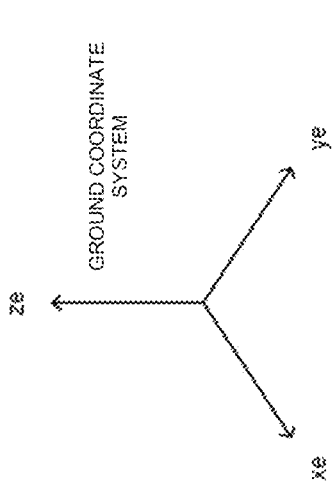
FIG. 3 is a view illustrating an attitude angle of the vehicle coordinate system with respect to a ground coordinate system.

FIG. 2 is a view illustrating a vehicle coordinate system with respect to a ground coordinate system. In the vehicle coordinate system, the x-axis, the y-axis, and the z-axis indicate a forward/rearward traveling direction, a lateral direction (width direction), and a vertical direction of the vehicle 600, respectively. FIG. 3 is a view illustrating an attitude angle of the vehicle coordinate system with respect to the ground coordinate system. The vehicle attitude angle is indicated as a vehicle roll angle $\varphi$, a vehicle pitch angle $\theta$, and a vehicle yaw angle $\psi$, which represent rotation angles of the axes of the vehicle coordinate system relative to the ground coordinate system. The coordinate systems each are a right-handed coordinate system with the z-axis pointing upward.

Figure 4:
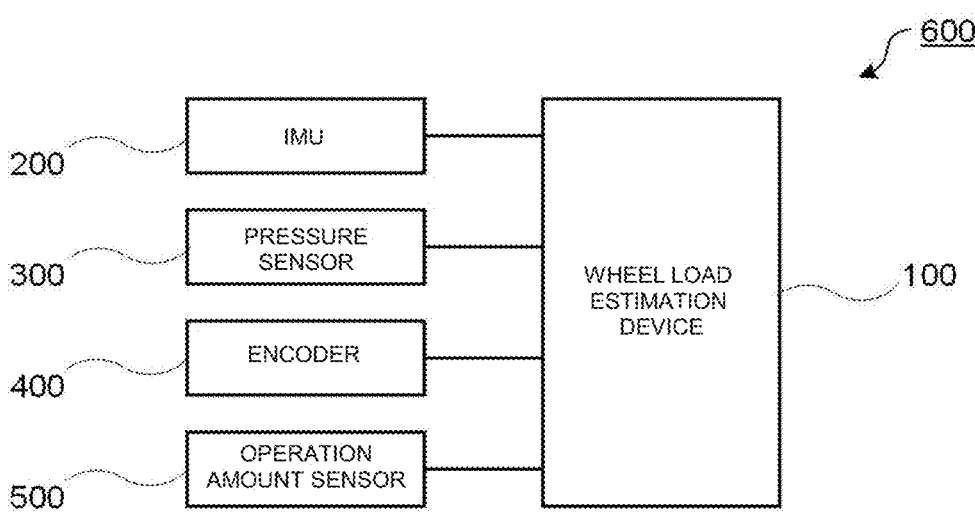
FIG. 4 is a block diagram illustrating a hardware configuration of the vehicle 600.

FIG. 4 is a block diagram illustrating a hardware configuration of the vehicle 600. The vehicle 600 includes a wheel load estimation device 100 and detection units. The detection units may include an IMU 200, a pressure sensor 300, an encoder 400, and an operation amount sensor 500. IMU stands for Inertial Measurement Unit. The IMU 200, the pressure sensor 300, the encoder 400, and the operation amount sensor 500 are connected to the wheel load estimation device 100.

The detection units detect information related to a motion of the vehicle 600. The wheel load estimation device 100 receives pieces of information detected by the detection units. The vehicle 600 may be a vehicle that travels with the load 602 loaded in various manners, such as a forklift truck, a truck, a trailer, a bus, or the like. In the present embodiment, the vehicle 600 will be described as a rear-wheel steering forklift truck. In the following, the IMU 200, the pressure sensor 300, the encoder 400, and the operation amount sensor 500 will be further described.

The IMU 200 includes an acceleration sensor, and a gyroscope sensor based on a strain sensor or a MEMS sensor. The IMU 200 detects accelerations in three axial directions and angular velocities about three axes in the vehicle coordinate system, and outputs detection values. The IMU 200 is disposed at any suitable position in the vehicle 600.

The pressure sensor 300 is provided on the entire surface of a loading surface of the fork 603 on which the load 602 is placed. The pressure sensor 300 is, for example, a sheet-shaped sensor that detects pressure applied to various positions on the loading surface and outputs a detection value.

The encoder 400 detects the rotation angle of a lifting hydraulic motor for moving the inner mast 605 up and down, and outputs a detection value.

The operation amount sensor 500 detects a depression amount of an accelerator pedal, a depression amount of a brake pedal, and a steering angle, and outputs detection values.

1-2. Wheel load estimation device 100

Figure 5:
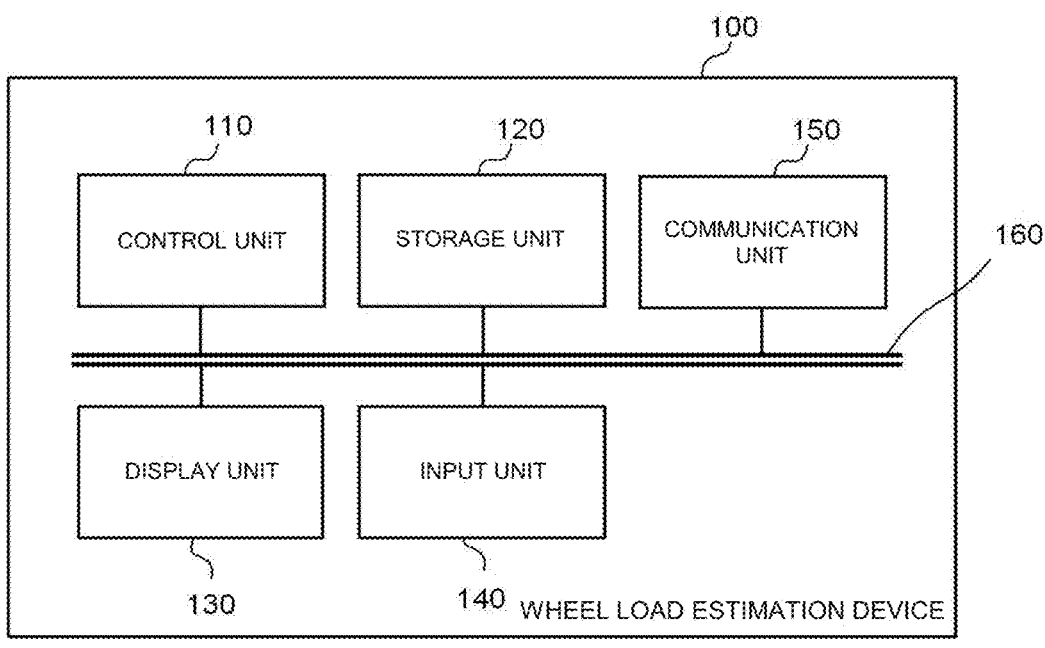
FIG. 5 is a block diagram illustrating a hardware configuration of a wheel load estimation device 100.

FIG. 5 is a block diagram illustrating a hardware configuration of the wheel load estimation device 100. The wheel load estimation device 100 includes a control unit 110, a storage unit 120, a display unit 130, an input unit 140, and a communication unit 150, and these component parts are electrically connected via a communication bus 160 in the wheel load estimation device 100. These component parts will be further described.

The control unit 110 executes processing and control of the overall operation of the wheel load estimation device 100. The control unit 110 is, for example, a Central Processing Unit (CPU) (not illustrated). The control unit 110 reads out predetermined programs stored in the storage unit 120 to carry out various functions related to the wheel load estimation device 100. That is, the control unit 110, which is an example of hardware, executes information processing by the software stored in the storage unit 120, which allows the various functions related to the wheel load estimation device 100 to be executed as functional units included in the control unit 110. These are discussed in further detail in Section 2. The control unit 110 is not limited to one, and a plurality of control units 110 may be provided for various functions. The control unit 110 may be a combination of these.

The storage unit 120 stores various pieces of information necessary for information processing of the wheel load estimation device 100. The storage unit 120 may be implemented, for example, as a storage device such as a Solid State Drive (SSD) that stores various programs related to the wheel load estimation device 100 executed by the control unit 110, or as a memory such as a Random Access Memory (RAM) that stores temporarily required information (arguments, arrays, etc.) related to calculation of the program. A combination of these may be used.

The display unit 130 may be included in a housing of the wheel load estimation device 100, or may be attached as an external device. The display unit 130 displays a screen of a Graphical User Interface (GUI) that can be operated by a user. The display unit 130 may be, for example, a CRT display, a liquid crystal display, an organic electroluminescence display, or a plasma display.

The input unit 140 may be included in the housing of the wheel load estimation device 100, or may be attached as an external device. For example, the input unit 140 may be integrated with the display unit 130 and implemented as a touch panel. If the display unit 130 is a touch panel, the user can input a tap operation, a swipe operation, or the like. Instead of the touch panel, a switch button, a mouse, a QWERTY keyboard, or the like may be used. That is, the input unit 140 accepts an operational input made by the user. The input is transferred as a command signal to the control unit 110 via the communication bus 160. The control unit 110 executes predetermined control and calculations, as necessary.

The communication unit 150 is preferably a wired communication means such as a USB, IEEE1394, Thunderbolt (registered trademark), or wired LAN network communication, but may also include wireless LAN network communication, mobile communication such as 5G/LTE/3G, Bluetooth (registered trademark) communication, or the like, as necessary. That is, the communication unit 150 is more preferably implemented as a collection of these multiple communication means. That is, the wheel load estimation device 100 transmits and receives various pieces of information to and from the component parts via the communication unit 150.

Section 2. Functional Configuration

In Section 2, a functional configuration of the first embodiment will be described. As described above, the control unit 110, which is an example of hardware, executes information processing by the software stored in the storage unit 120, which allows the various functions to be executed as functional units included in the control unit 110.

Figure 6:
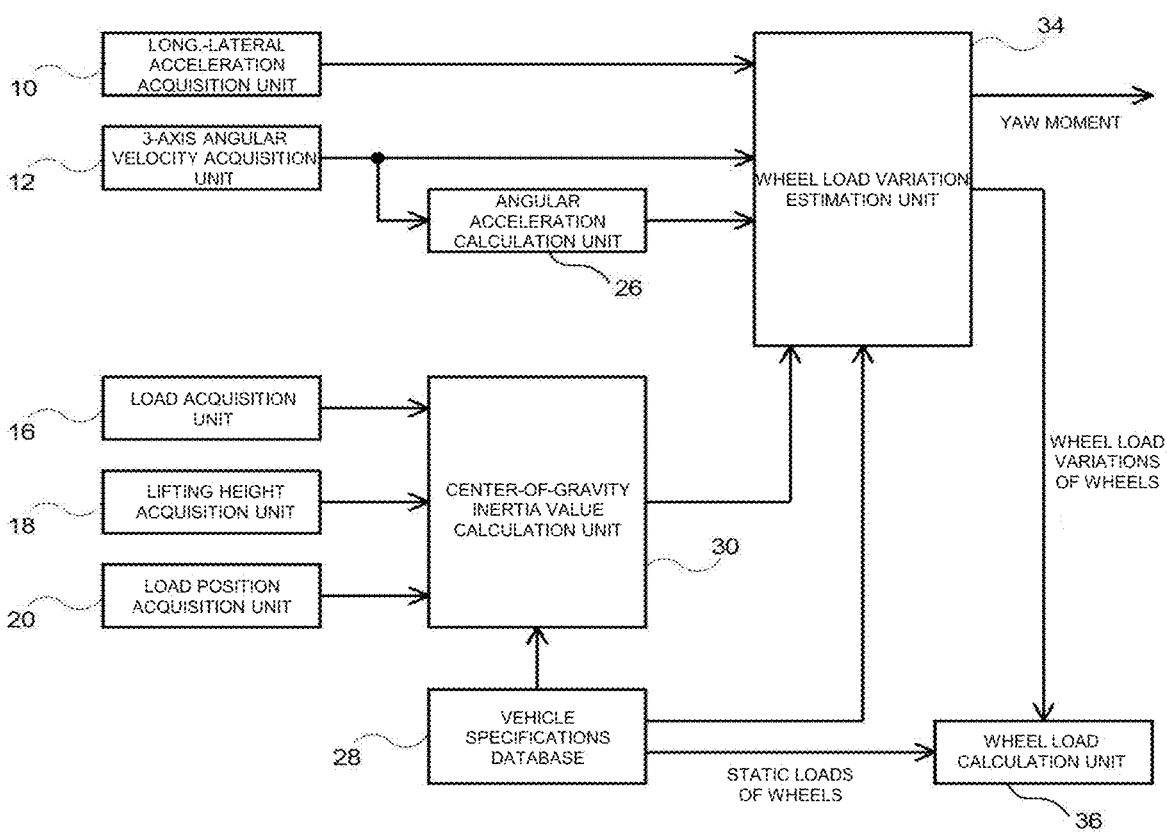
FIG. 6 is a block diagram illustrating functions realized by the wheel load estimation device 100 (control unit 110)

FIG. 6 is a block diagram illustrating functions performed by the wheel load estimation device 100 (control unit 110). Specifically, the wheel load estimation device 100 (control unit 110) includes a longitudinal-lateral acceleration acquisition unit 10, a three-axis angular velocity acquisition unit 12, a load acquisition unit 16, a lifting height acquisition unit 18, a load position acquisition unit 20, an angular acceleration calculation unit 26, a center-of-gravity inertia value calculation unit 30, a wheel load variation estimation unit 34, and a wheel load calculation unit 36. The wheel load estimation device 100 include a vehicle specifications database 28, as a Read Only Memory (ROM). The vehicle specifications database 28 is provided as a separate storage unit from the storage unit 120. The wheel load estimation device 100 estimates a wheel load applied to each of the wheels of the vehicle 600.

In other words, the wheel load estimation device 100 (control unit 110) includes an acquisition unit (the longitudinal-lateral acceleration acquisition unit 10, the three-axis angular velocity acquisition unit 12, the load acquisition unit 16, the lifting height acquisition unit 18, and the load position acquisition unit 20), a calculation unit (the angular acceleration calculation unit 26, the center-of-gravity inertia value calculation unit 30), and an estimation unit (the wheel load variation estimation unit 34). Furthermore, the wheel load estimation device 100 includes the vehicle specifications database 28 as the storage unit, and the control unit 110 of the wheel load estimation device 100 includes the wheel load calculation unit 36.

The longitudinal-lateral acceleration acquisition unit 10 receives detection values output from the IMU 200, and acquires the longitudinal acceleration $S_{xCG}$ at the center of gravity $CG_{all}$ of the vehicle 600 using the acceleration $S_x$ in the x-axis direction, the angular velocities P, Q, R, and the angular accelerations $\dot{P}$, $\dot{Q}$, $\dot{R}$ about the axes contained in the detection values. The longitudinal-lateral acceleration acquisition unit 10 receives the detection values output from the IMU 200, and acquires the lateral acceleration $S_{yCG}$ at the center of gravity $CG_{all}$ of the vehicle 600 using the acceleration $S_y$ in the y-axis direction, the angular velocities P, Q, R, and the angular accelerations $\dot{P}$, $\dot{Q}$, $\dot{R}$ about the axes contained in the detection values.

The three-axis angular velocity acquisition unit 12 receives the detection values output from the IMU 200, and acquires the angular velocity about the x-axis included in the detection values as the roll angular velocity P, the angular velocity about the y-axis included in the detection values as the pitch angular velocity Q, and the angular velocity about the z-axis included in the detection values as the yaw angular velocity R.

The load acquisition unit 16 receives a detection value output from the pressure sensor 300, and acquires the mass $M_\alpha$ of the load 602 loaded on the fork 603 by converting the detection value indicating the pressure into a mass.

The lifting height acquisition unit 18 receives a detection value output from the encoder 400, calculates a height of the fork 603 relative to a reference position (e.g., the bottom) from the rotation angle of the lifting hydraulic motor indicated by the detection value, and acquires the calculated height as the lifting height.

The loading position acquisition unit 20 receives detection values output from the pressure sensor 300, and acquires the position on the loading surface of the fork 603 at which the largest detection value is detected as the position of the load 602 loaded on the fork 603.

Accordingly, the acquisition unit acquires the detection values output from the sensors as parameters. The parameters are parameters related to the motion of the vehicle, and include the acceleration of the vehicle, and at least one of the angular velocity and the angular acceleration about the three axes of the vehicle in the first embodiment.

The angular acceleration calculation unit 26 calculates the roll angular acceleration $\dot{P}$, the pitch angular acceleration $\dot{Q}$, and the yaw angular acceleration $\dot{R}$ by approximate differentiation of the roll angular velocity P, the pitch angular velocity Q, and the yaw angular velocity R acquired by the three-axis angular velocity acquisition unit 12 for each sampling.

In the vehicle specifications database 28, various data related to the vehicle 600 are stored. Specifically, the vehicle specifications data base 28 stores pieces of information including the roll center $h_R$, mass $M_\beta$, static loads $FL_{z0}$, $FR_{z0}$, $RL_{z0}$, $RR_{z0}$ of the wheels, roll stiffness distributions $\alpha_f$, $\alpha_r$, a structure of each of the component parts including its shape and mass $m_j$, and the arrangement of the wheels.

The center-of-gravity inertia value calculation unit 30 totals the mass $M_\alpha$ of the load 602 acquired by the load acquisition unit 16 and the mass $M_\beta$ of the vehicle 600 stored in the vehicle specifications database 28 to calculate a mass $M_{all}$ of the entire vehicle 600 with the load 602 included. The center-of-gravity inertia value calculation unit 56 calculates a position 602A of the center of gravity of the load 602 based on information acquired by the load acquisition unit 16, the lifting height acquisition unit 18, and the load position acquisition unit 20. As a method for calculating the position 602A of the center of gravity of the load 602, for example, the method described in Japanese Patent Publication 2020-93741 is used.

The center-of-gravity inertia value calculation unit 30 calculates the position 600A of the center of gravity $CG_{all}$ of the entire vehicle 600 and the positions 601A, 603A, 604A, 605A of the centers of gravity of the component parts j based on the position 602A of the center of gravity of the load 602 and the structures of the component parts stored in the vehicle specifications database 28. The center-of-gravity inertia value calculation unit 30 calculates differences ($\Delta x_j$, $\Delta y_j$, $\Delta z_j$) between the position 600A of the center of gravity $CG_{all}$ of the entire vehicle 600 and the position 601A, 603A, 604A, 605A of the center of gravity of the component parts j in the axial directions. Further, the center-of-gravity inertia value calculation unit 30 calculates the inertia tensor $J_{all}$ using the calculated $\Delta x_j$, $\Delta y_j$, $\Delta z_j$ and the mass $m_j$ of the component parts j stored in the vehicle specifications database 28.

The center-of-gravity inertia value calculation unit 30 sets the position of the calculated position 600A of the center of gravity $CG_{all}$ of the entire vehicle 600 in the z-axis direction as $h_{CG}(=z_{CG})$.

In this manner, the calculation unit calculates the inertial force generated in the vehicle based on the acquired parameters and the mass of the vehicle.

The wheel load variation estimation unit 34 calculates a distance ($h_{CG}-h_R$) between $CG_{all}$ and the roll center $h_R$ in the z-axis direction from $h_{CG}$ calculated by the center-of-gravity inertia value calculation unit 30 and the position $h_R$ of the roll center stored in the vehicle specifications database 28. The wheel load variation estimation unit 34 estimates wheel load variations $\Delta FL_z$, $\Delta FR_z$, $\Delta RL_z$, $\Delta RR_z$ using the longitudinal acceleration $S_{xCG}$ and the lateral acceleration $S_{yCG}$ acquired by the longitudinal-lateral acceleration acquisition unit 10, the roll angular velocity P, the pitch angular velocity Q, and the yaw angular velocity R acquired by the three-axis angular velocity acquisition unit 12, the roll angular acceleration $\dot{P}$, the pitch angular acceleration $\dot{Q}$, and the yaw angular acceleration $\dot{R}$ calculated by the angular acceleration calculation unit 26, the mass $M_{all}$ of the entire vehicle 600, the inertia tensor $J_{all}$, and the position $h_{CG}$ of $CG_{all}$ in the z-axis direction calculated by the center-of-gravity inertia value calculation unit 30, the calculated distance ($h_{CG}-h_R$) between $CG_{all}$ and the roll center $h_R$ in the z-axis direction, distances $t_j$, $t_r$, $l_f$, $l_r$ of the wheels relative to $CG_{all}$ in the x-axis and y-axis directions, and the roll stiffness distributions $\alpha f$, $\alpha r$.

The wheel load calculation unit 36 calculates wheel loads $FL_z$, $FR_z$, $RL_z$, $RR_z$ by adding the wheel load variations $\Delta FL_z$, $\Delta FR_z$, $\Delta RL_z$, $\Delta RR_z$ estimated by the wheel load variation estimation unit 34 and the static loads $FL_{z0}$, $FR_{z0}$, $RL_{z0}$, $RR_{z0}$ of the wheels stored in the vehicle specifications database 28, and outputs the calculated wheel loads as estimation results.

In this manner, the estimation unit estimates the wheel loads based on the calculated inertial force and predetermined estimation equations, which will be described in Section 3.

Section 3. Principle

In the Section 3, a principle of the first embodiment will be described.

Figures 7A, 7B:
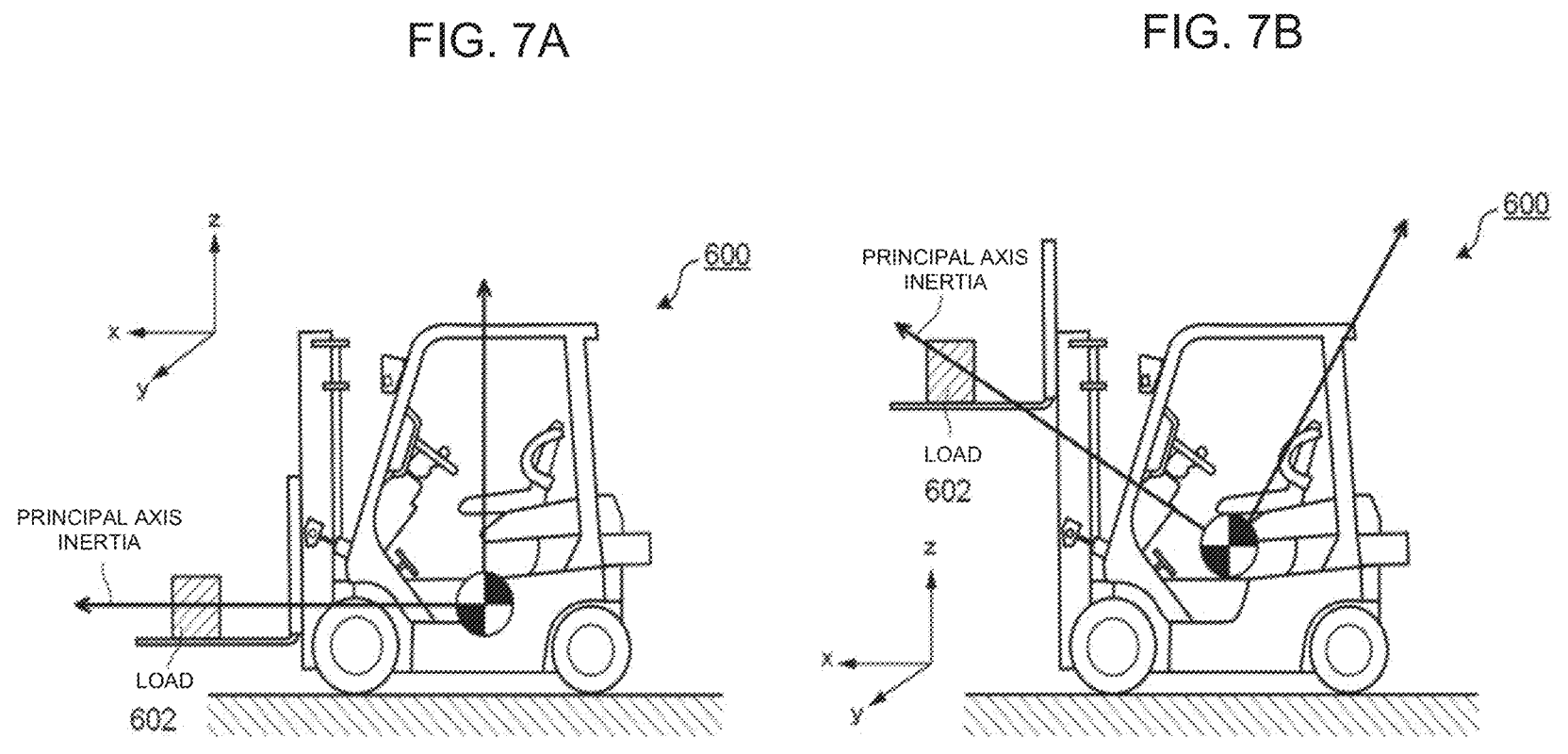

Unlike passenger cars, a forklift truck travels with a heavy load lifted at various lifting heights. In addition, the loading position of the load may shift in the y-direction (the lateral direction of the forklift truck) relative to the center of gravity of the forklift truck. Depending on a loading state of the load, the orientation of the principal axis inertia changes with respect to the roll, pitch, and yaw rotation axes. Therefore, in the first embodiment, the principal axis inertia and the product of inertia are set according to the loading state of the load. FIGS. 7A and 7B are schematic conceptual diagrams illustrating the difference in the principal axis inertia caused by the difference in the lifting height of the load 602. The orientation of the principal axis inertia changes between a case where the lifting height of the load is low as in FIG. 7A, and a case where the lifting height of the load is high as in FIG. 7B.

In order to deal with the different loading states of the load as illustrated in FIGS. 7A and 7B, a motion of the vehicle will be described using FIG. 2 and a six degree of freedom model of the vehicle as expressed in equations (3) to (5) below. It is noted that equation (3) represents a rotational motion of the vehicle 600, equation (4) represents a translational motion of the vehicle 600, and equation (5) represents an update equation for the attitude angle of the vehicle coordinate system with respect to the ground coordinate system illustrated in FIG. 3.

$$\begin{bmatrix} \dot{P} \\ \dot{Q} \\ \dot{R} \end{bmatrix} = J_{all}^{-1} \cdot \left( -\begin{bmatrix} 0 & -R & Q \\ R & 0 & -P \\ -Q & P & 0 \end{bmatrix} \cdot J_{all} \cdot \begin{bmatrix} P \\ Q \\ R \end{bmatrix} + \begin{bmatrix} L_v \\ M_v \\ N_v \end{bmatrix} \right) \tag{3}$$

$$\begin{bmatrix} \dot{U} \\ \dot{V} \\ \dot{W} \end{bmatrix} = -\begin{bmatrix} 0 & -R & Q \\ R & 0 & -P \\ -Q & P & 0 \end{bmatrix} \cdot \begin{bmatrix} U \\ V \\ W \end{bmatrix} + g \cdot \begin{bmatrix} \sin\theta \\ -\sin\phi\cos\theta \\ -\cos\phi\cos\theta \end{bmatrix} + \frac{1}{M_{all}} \cdot \begin{bmatrix} X_v \\ Y_v \\ Z_v \end{bmatrix} \tag{4}$$

$$\begin{bmatrix} \dot{\phi} \\ \dot{\theta} \\ \dot{\psi} \end{bmatrix} = \begin{bmatrix} 1 & \sin\phi\tan\theta & \cos\phi\tan\theta \\ 0 & \cos\theta & -\sin\phi \\ 0 & \sin\phi/\cos\theta & \cos\phi/\cos\theta \end{bmatrix} \cdot \begin{bmatrix} P \\ Q \\ R \end{bmatrix} \tag{5}$$

In equations (3) to (5), $L_V$, $M_V$, and $N_V$ represent a roll moment, a pitch moment, and a yaw moment, (inertial forces), respectively. Furthermore, U, V, and W represent the velocities in the x, y, and z axes directions in the vehicle coordinate system, respectively, and $X_V$, $Y_V$, and $Z_V$ represent the longitudinal, lateral, and vertical forces acting on the vehicle 600, respectively. The inertia tensor $J_{all}$ corresponds to the "inertia value" in the claims.

The setting of the inertia tensor $J_{all}$ in equation (3) will now be explained.

A configuration of the inertia tensor $J_{all}$ is indicated in equation (6). In the right-hand side of the following equation, the diagonal elements each are the principal axis inertia and each of the off-diagonal elements each are a product of inertia.

$$J_{all} = \begin{bmatrix} J_{xx} & J_{xy} & J_{xz} \\ J_{yx} & J_{yy} & J_{yz} \\ J_{zx} & J_{zy} & J_{zz} \end{bmatrix} = \tag{6}$$

$$\begin{bmatrix} \sum_{j=1}^{N} m_j \cdot (\Delta y_j^2 + \Delta z_j^2) + & -\sum_{j=1}^{N} m_j \cdot (\Delta x_j + \Delta y_j) & -\sum_{j=1}^{N} m_j \cdot (\Delta x_j + \Delta z_j) \\ J_A & & \\ -\sum_{j=1}^{N} m_j \cdot (\Delta x_j + \Delta y_j) & \sum_{j=1}^{N} m_j \cdot (\Delta x_j^2 + \Delta z_j^2) + & -\sum_{j=1}^{N} m_j \cdot (\Delta y_j + \Delta z_j) \\ & J_B & \\ -\sum_{j=1}^{N} m_j \cdot (\Delta x_j + \Delta z_j) & -\sum_{j=1}^{N} m_j \cdot (\Delta y_j + \Delta z_j) & \sum_{j=1}^{N} m_j \cdot (\Delta x_j^2 + \Delta y_j^2) \end{bmatrix}$$

In equation (6), a suffix "j" represents a variable specifying each of the component parts, N represents the total number of the component parts, and $m_j$ represents a weight of each of the component parts j. The position ($x_{CG}$, $y_{CG}$, $z_{CG}$) of the center of gravity $CG_{all}$ of the entire vehicle 600 can be calculated using the mass of the load 602, the lifting height, and the loading position of the load 602 relative to the fork 603. In equation (6), $\Delta x_j$, $\Delta y_j$, $\Delta z_j$ are differences between the position 600A of the center of gravity $CG_{all}$ of the entire vehicle 600 and each of the positions ($x_j$, $y_j$, $z_j$) 601A, 602A, 603A, 604A, 605A of the center of gravity of the component parts j in the respective axial directions, and are calculated by the following equations.

$$\Delta x_j = x_j - x_{CG}, \; \Delta y_j = y_j - y_{CG}, \; \Delta z_j = z_j - z_{CG} \tag{7}$$

Figure 8:
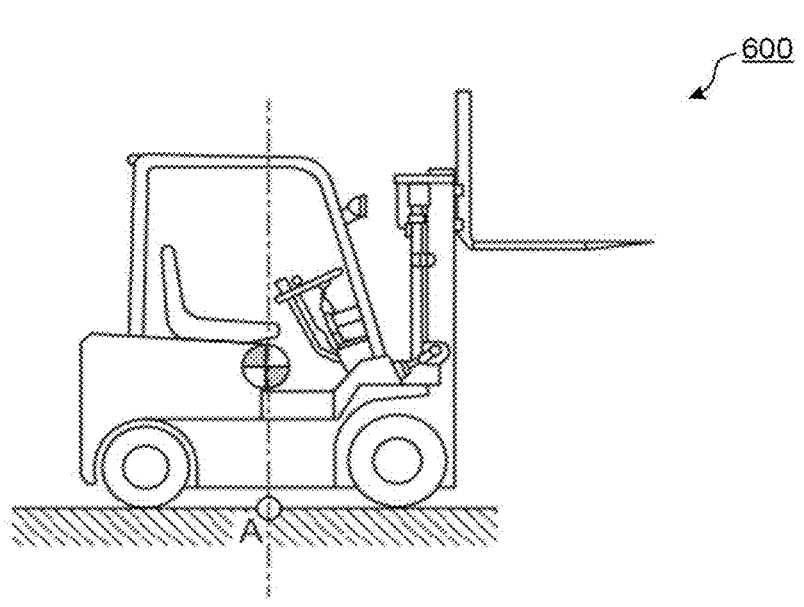
FIG. 8 is a view illustrating a pitch rotation center of the vehicle 600.
Figure 9:
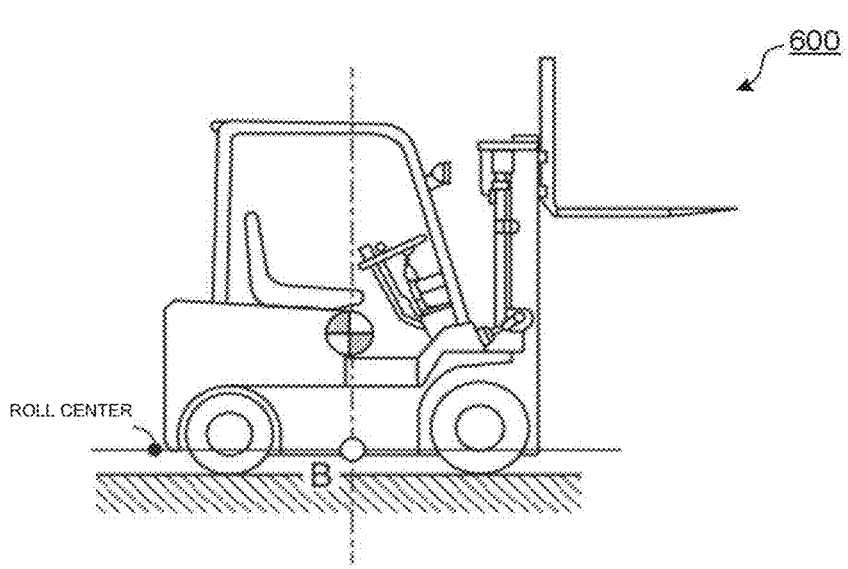
FIG. 9 is a view illustrating a roll rotation center of the vehicle 600.

FIG. 8 is a view illustrating a pitch rotation center of the vehicle 600. FIG. 9 is a view illustrating a roll rotation center of the vehicle 600. $J_A$ and $J_B$ in equation (6) are correction values for inertia as viewed from point A and point B in FIGS. 8 and 9, respectively, and are expressed by equations (8) and (9), respectively. Point A in FIG. 8 is the pitch rotation center and is a point at which a vertical line extending through the center of gravity of the entire vehicle 600 while the vehicle 600 is at a stop on a flat road and a ground surface intersect. Point B in FIG. 9 is the roll rotation center and is a point at which a vertical line extending through the center of gravity of the entire vehicle 600 while the vehicle is at a stop on the flat road and the roll center intersect.

$$J_A = M_{all} \cdot (h_{CG} - h_R)^2 \tag{8}$$

$$J_B = M_{all} \cdot h_{CG}^2 \tag{9}$$

Figure 10:
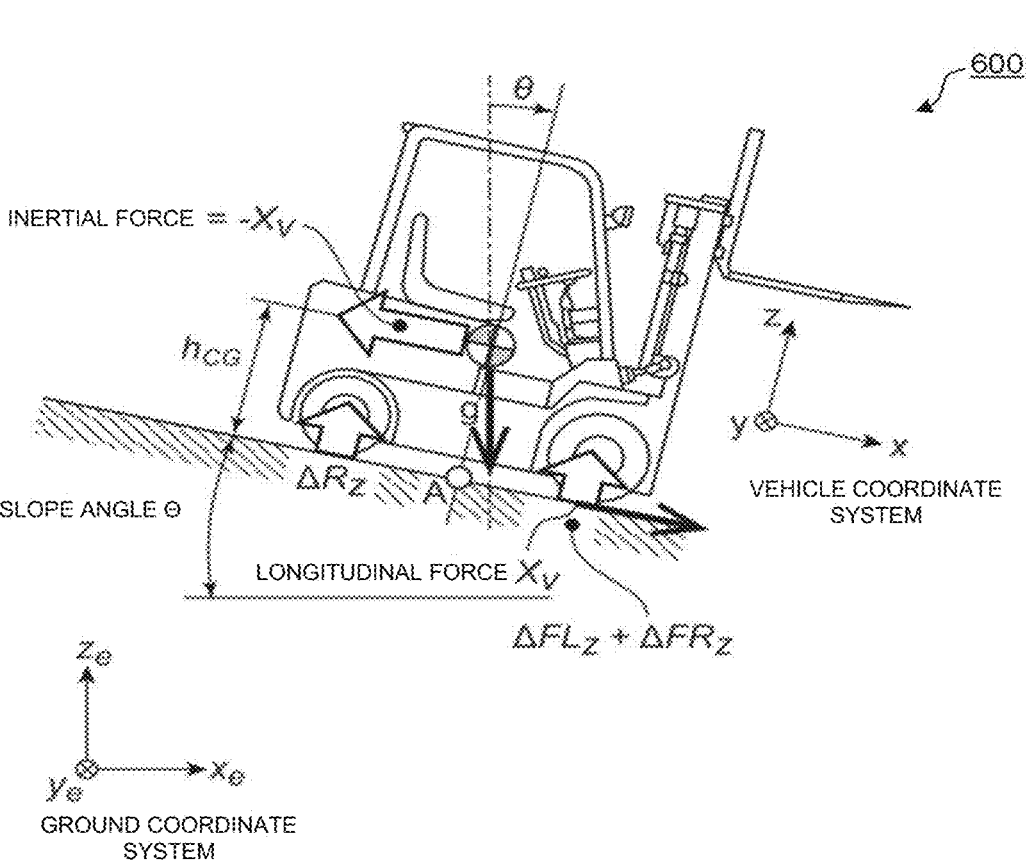
FIG. 10 is a view illustrating a longitudinal force acting on the vehicle 600.

FIG. 10 is a view illustrating a longitudinal force acting on the vehicle 600. Using FIG. 10, a physical equation for the longitudinal force $X_V$ acting on the vehicle 600 when the vehicle 600 travels straight downhill on the slope and a vehicle pitch angle $\theta$ is generated due to the slope angle $\Theta$ will be described.

Based on FIG. 10, the physical equation of the longitudinal force $X_V$ obtained from equation (4) is expressed. By transforming the first column of equation (4), the longitudinal force $X_V$ is expressed as follows.

$$X_v = M_{all} \cdot [\dot{U} - RV + QW - g \cdot \sin\theta] \tag{10}$$

In equation (10), $\dot{U}$−RV+QW is the longitudinal acceleration caused by vehicle behavior, and g·sin $\theta$ is a component of the vehicle pitch angle of the gravitational acceleration. From the physical equation of (10), the longitudinal force on the slope is expressed using the component of the vehicle pitch angle $\theta$ of the gravitational acceleration in addition to the acceleration components based on vehicle behaviors $\dot{U}$, V, W, and Q, R.

Figure 11A:
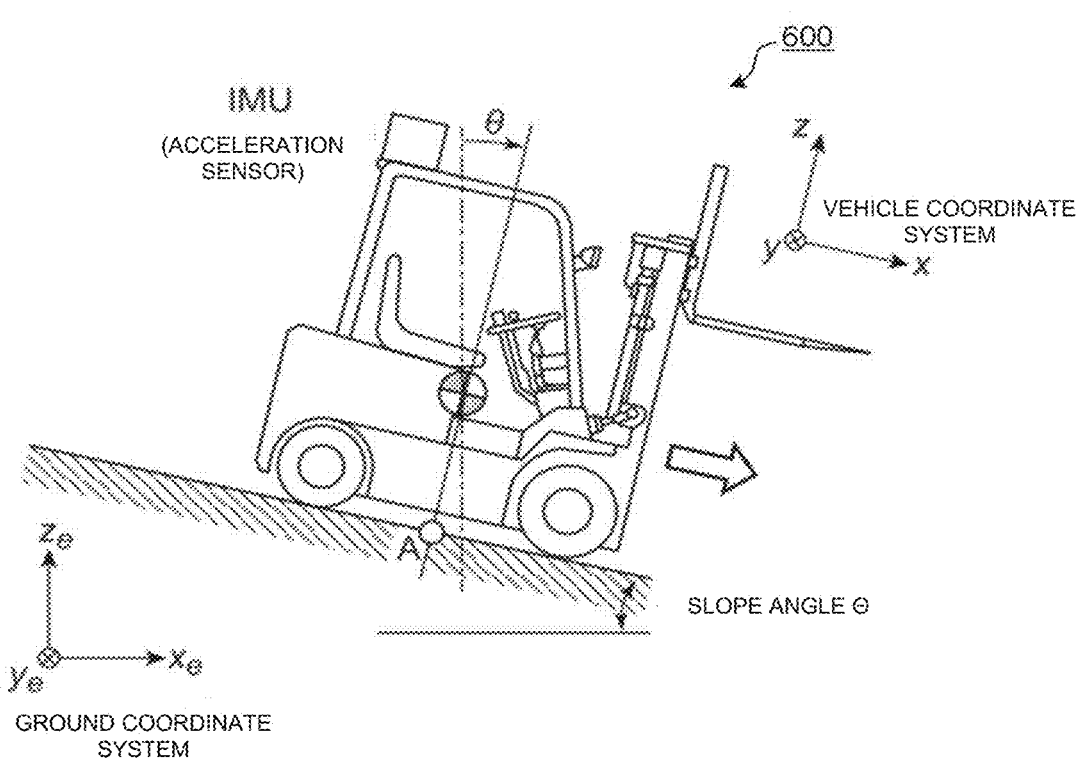
FIGS. 11A and 11B are views illustrating an image of measurement by an IMU (acceleration sensor) when the vehicle travels straight on a slope.
Figure 11B:
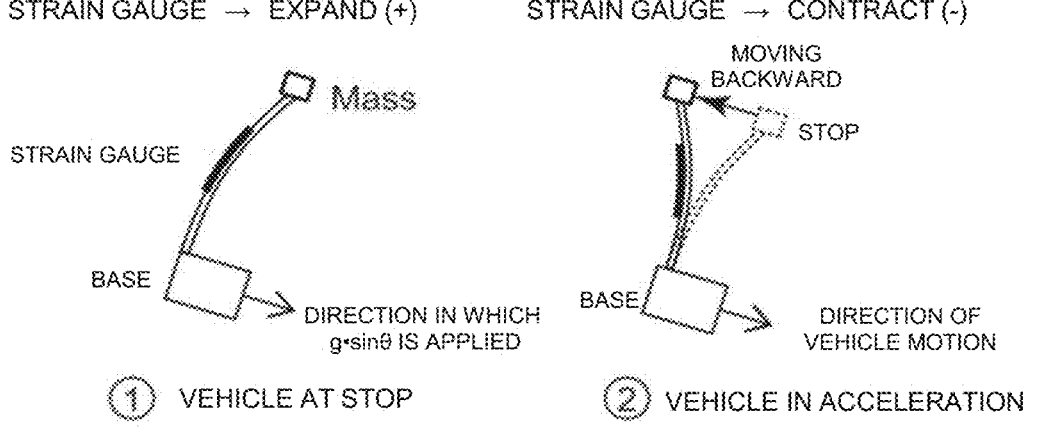

FIGS. 11A and 11B each are a view illustrating an image of measurement by the IMU (acceleration sensor) when the vehicle 600 travels straight on a slope. FIG. 11A illustrates the acceleration sensor tilting forward on the slope where the vehicle pitch angle is positive, and FIG. 11B illustrates deformation of a strain gauge when the vehicle is at a stop and when the vehicle accelerates using a strain gauge acceleration sensor as an example. As illustrated in FIG. 11B, when the vehicle is at a stop on the slope, the mass of the sensor is tilted forward due to the action of gravity, which causes the strain gauge to expand. When the vehicle accelerates, the mass of the sensor moves backward due to the inertial force, and as the inertial force (acceleration) increases, the strain gauge contracts. Where the sign of longitudinal acceleration detection when the vehicle is moving forward is set positive, the sign of the gravitational acceleration g is negative. Where the longitudinal acceleration value detected by the sensor is defined as $S_{xCG}$, $S_{xCG}$ is expressed by equation (11) based on the output sign of the strain gauge in FIG. 11B.

$$S_{xCG} = \dot{U} - RV + QW - g \cdot \sin\theta \qquad (11)$$

A part in the parentheses on the right-hand side of equation (10) is the same as the right-hand side of equation (11), and the longitudinal force $X_V$ is given by equation (12) using $S_{xCG}$.

$$X_v = M_{all} \cdot [\dot{U} - RV + QW - g \cdot \sin\theta] = M_{all} \cdot S_{xCG} \qquad (12)$$

Figure 12:
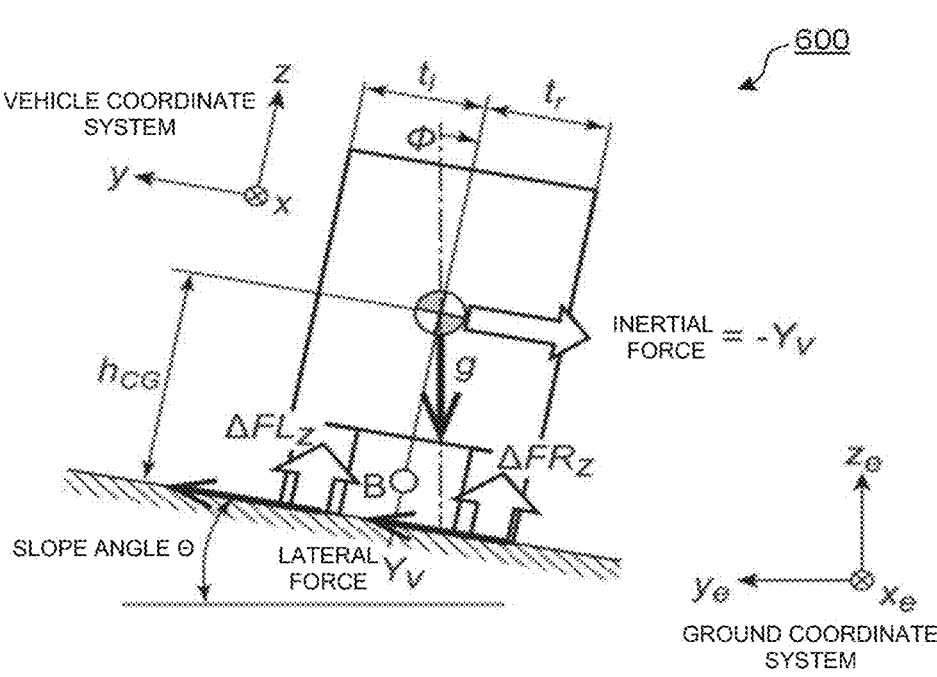
FIG. 12 is a view illustrating a lateral force acting on the vehicle 600.

FIG. 12 is a view illustrating the lateral force acting on the vehicle 600. A physical equation for the lateral force $Y_V$ acting on the vehicle 600 when the vehicle 600 travels across the slope illustrated in FIG. 12 and a vehicle roll angle $\phi$ is generated due to the slope angle $\Theta$ will be described.

Based on FIG. 12, the physical equation for the lateral force $Y_V$ obtained from equation (4) is expressed. By transforming the second column of equation (4), the lateral force $Y_V$ is expressed as equation (13).

$$Y_v = M_{all}[\dot{V} + RU - PW + g \cdot \sin\phi\cos\theta] \qquad (13)$$

In equation (13), $\dot{V}+RU-PW$ is the lateral acceleration caused by the vehicle behavior, and $g \cdot \sin\phi \cdot \cos\theta$ is a component of the roll angle $\varphi$ of the gravitational acceleration. From the physical equation of (13), the lateral force on the slope is expressed using the component of the vehicle roll angle $\varphi$ of the gravitational acceleration in addition to the acceleration components based on the vehicle behaviors U, V̇, W, and P, R.

Figure 13A:
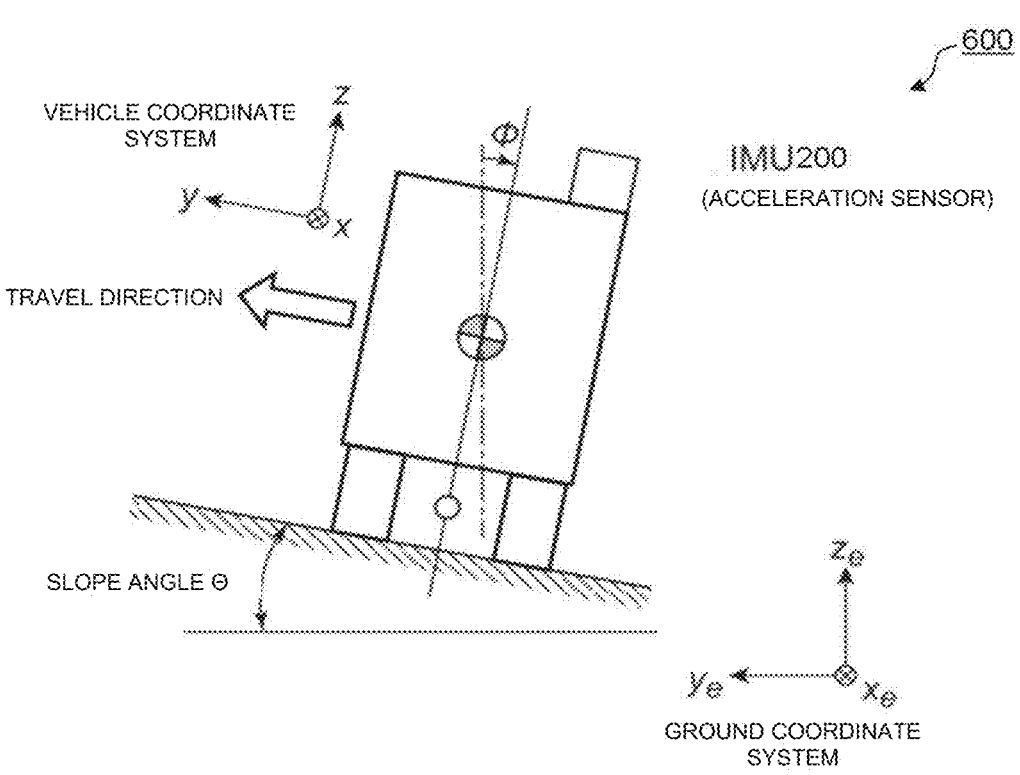
FIGS. 13A and 13B are views illustrating an image of the measurement by the IMU (acceleration sensor) when the vehicle travels across on the slope.
Figure 13B:
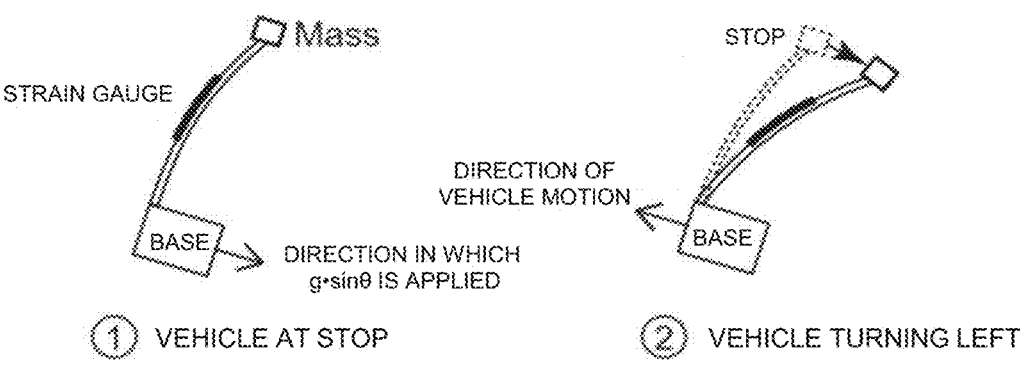

FIGS. 13A and 13B each are a view illustrating an image of measurement by the IMU (acceleration sensor) when the vehicle travels across the slope. FIG. 13A illustrates the acceleration sensor tilting in the lateral direction due to the slope, and FIG. 13B illustrates the deformation of the strain gauge when the vehicle 600 is at a stop and when the vehicle 600 turns left. As illustrated in FIG. 13B, when the vehicle 600 is at a stop on the slope, the mass of the sensor is tilted rightward in the illustration due to the action of gravity, which causes the strain gauge to expand. When the vehicle 600 turns left, the mass of the sensor is further tilted rightward in the illustration due to the inertial force, and the strain gauge expands in the same direction as when being at a stop. Where the sign of the detected lateral acceleration when the vehicle turns left is positive, the sign of the gravitational acceleration g is also positive. Where the lateral acceleration value detected by the sensor is defined as $S_{yCG}$, $S_{yCG}$ is expressed by equation (14) based on the output sign of the strain gauge in FIG. 13B.

$$S_{yCG} = \dot{V} + RU - PW + g \cdot \sin\phi\cos\theta \qquad (14)$$

A part in parentheses on the right-hand side of equation (13) is the same as the right-hand side of equation (14), and the lateral force $Y_V$ is given by equation (15) using $S_{yCG}$.

$$Y_v = M_{all} \cdot [\dot{V} + RU - PW + g \cdot \sin\phi\cos\theta] = M_{all} \cdot S_{yCG} \qquad (15)$$

From equation (15), the lateral acceleration $S_{yCG}$ calculated by the IMU 200 includes the vehicle roll angle and the vehicle pitch angle, and the lateral force $Y_V$ can be calculated by the product of the mass $M_{all}$ of the entire vehicle 600 and the lateral acceleration $S_{yCG}$ on the slope, similarly to that on the flat road.

Wheel load estimation requires calculation of moments L and M based on the inertial forces of the longitudinal force $X_V$ and the lateral force $Y_V$. From FIGS. 10 and 12, in view of an increase of the roll angular acceleration $\dot{P}$ by the inertial force of the lateral force $Y_V$ and an increase of the pitch angular acceleration $\dot{Q}$ by the inertial force of the longitudinal force $X_V$ in equation (1), the moment L about point A and the moment M about point B can be expressed, from equations (8) and (10), as equations (16) and (17), respectively.

$$L = Y_v \cdot (h_{CG} - h_R) = M_{all} \cdot S_{yCG} \cdot (h_{CG} - h_R) \qquad (16)$$

$$M = -X_v \cdot h_{CG} = -M_{all} \cdot S_{xCG} \cdot h_{CG} \qquad (17)$$

The roll moment $L_V$ in equation (3) is expressed by equation (18) using equation (16).

$$L_v = L + (\Delta FL_z + \Delta RL_z) \cdot t_l - (\Delta FR_z + \Delta RR_z) \cdot t_r = \qquad (18)$$
$$M_{all} \cdot S_{yCG} \cdot (h_{CG} - h_R) + (\Delta FL_z + \Delta RL_z) \cdot t_l - (\Delta FR_z + \Delta RR_z) \cdot t_r$$

The pitch moment $M_V$ in equation (3) is expressed by equation (19) using equation (17).

$$M_v = M - (\Delta FL_z + \Delta FR_z) \cdot l_f + (\Delta RL_z + \Delta RR_z) \cdot l_r = \qquad (19)$$
$$-M_{all} \cdot S_{xCG} \cdot h_{CG} - (\Delta FL_z + \Delta FR_z) \cdot l_f + (\Delta RL_z + \Delta RR_z) \cdot l_r$$

Where the roll stiffness distributions of the front wheels and rear wheels are expressed as $a_f$ ($=k_f/(k_f+k_r)$) and $a_r$ ($=k_r/(k_f+k_r)$) using the vertical stiffness $k_r$ and the vertical stiffness $k_r$ of the front wheels and rear wheels, equation (20) holds between the wheel load variations and the roll stiffness distributions.

$$a_r \cdot (\Delta FL_z - \Delta FR_z) + a_f \cdot (-\Delta RL_z + \Delta RR_z) = 0 \qquad (20)$$

Equation (21) holds for the total of the wheel load variations of the wheels.

$$\Delta FL_z + \Delta FR_z + \Delta RL_z + \Delta RR_z = 0 \qquad (21)$$

The roll angular velocity P, the pitch angular velocity Q, and the yaw angular velocity R, as well as the longitudinal acceleration and the lateral acceleration at the center of gravity $CG_{all}$ of the entire vehicle 600 are obtained by the IMU 200. In addition, $\dot{P}$, $\dot{Q}$, and $\dot{R}$ in equation (1) are calculated by, for example, approximate differentiation of P, Q, and R measured for each sampling. In this case, the wheel load variation and the yaw moment $N_y$ are unknown parameters in equation (3). By expressing equation (3) using equations (18) to (21), the unknown parameters including the wheel load variation can be estimated by equation (22).

$$
\begin{bmatrix} \Delta FL_{z(i)} \\ \Delta FR_{z(i)} \\ \Delta RL_{z(i)} \\ \Delta RR_{z(i)} \\ N_{y(i)} \end{bmatrix} = \begin{bmatrix} t_l & -t_r & t_l & -t_r & 0 \\ -l_f & -l_f & l_r & l_r & 0 \\ 0 & 0 & 0 & 0 & 1 \\ 1 & 1 & 1 & 1 & 0 \\ a_r & -a_r & a_f & -a_f & 0 \end{bmatrix}^{-1} \cdot \tag{22}
$$

$$
\left\{ J_{all}^* \cdot \begin{bmatrix} \dot{P}_{(i)} \\ \dot{Q}_{(i)} \\ \dot{R}_{(i)} \\ 0 \\ 0 \end{bmatrix} + \begin{bmatrix} 0 & -R_{(i)} & Q_{(i)} & 0 & 0 \\ R_{(i)} & 0 & -P_{(i)} & 0 & 0 \\ -Q_{(i)} & P_{(i)} & 0 & 0 & 0 \\ 0 & 0 & 0 & 0 & 0 \\ 0 & 0 & 0 & 0 & 0 \end{bmatrix} \cdot J_{all}^* \cdot \begin{bmatrix} P_{(i)} \\ Q_{(i)} \\ R_{(i)} \\ 0 \\ 0 \end{bmatrix} + \right.
$$

$$
\left. \begin{bmatrix} -M_{all} \cdot G_{yCG(i)} \cdot (h_{CG} - h_R) \\ M_{all} \cdot G_{xCG(i)} \cdot h_{CG} \\ 0 \\ 0 \\ 0 \end{bmatrix} \right\}
$$

In equation (22), i is the sampling interval, and −1 on the right shoulder of the first term on the right-hand side represents an inverse matrix. The wheel loads $FL_z$, $FR_z$, $RL_z$, $RR_z$ are calculated by adding the wheel load variations $\Delta FL_z$, $\Delta FR_z$, $\Delta RL_z$, $\Delta RR_z$ obtained from equation (22) to the static loads $FL_{z0}$, $FR_{z0}$, $RL_{z0}$, $RR_{z0}$ of the wheels stored in the vehicle specifications database 28.

In addition, $J_{all}^*$ in equation (22) is obtained by transforming equation (6) and expressed by equation (23).

$$
J_{all}^* = \begin{bmatrix} \sum_{j=1}^{N} m_j \cdot (\Delta y_j^2 + \Delta z_j^2) + J_A & -\sum_{j=1}^{N} m_j \cdot (\Delta x_j + \Delta y_j) & -\sum_{j=1}^{N} m_j \cdot (\Delta x_j + \Delta z_j) & 0 & 0 \\ -\sum_{j=1}^{N} m_j \cdot (\Delta x_j + \Delta y_j) & \sum_{j=1}^{N} m_j \cdot (\Delta x_j^2 + \Delta z_j^2) + J_B & -\sum_{j=1}^{N} m_j \cdot (\Delta y_j + \Delta z_j) & 0 & 0 \\ -\sum_{j=1}^{N} m_j \cdot (\Delta x_j + \Delta z_j) & -\sum_{j=1}^{N} m_j \cdot (\Delta y_j + \Delta z_j) & \sum_{j=1}^{N} m_j \cdot (\Delta x_j^2 + \Delta y_j^2) & 0 & 0 \\ 0 & 0 & 0 & 0 & 0 \\ 0 & 0 & 0 & 0 & 0 \end{bmatrix} \tag{23}
$$

Section 4. Information Processing Method

In Section 4, a method of information processing by the above-described wheel load estimation device 100 will be described.

Figure 14:
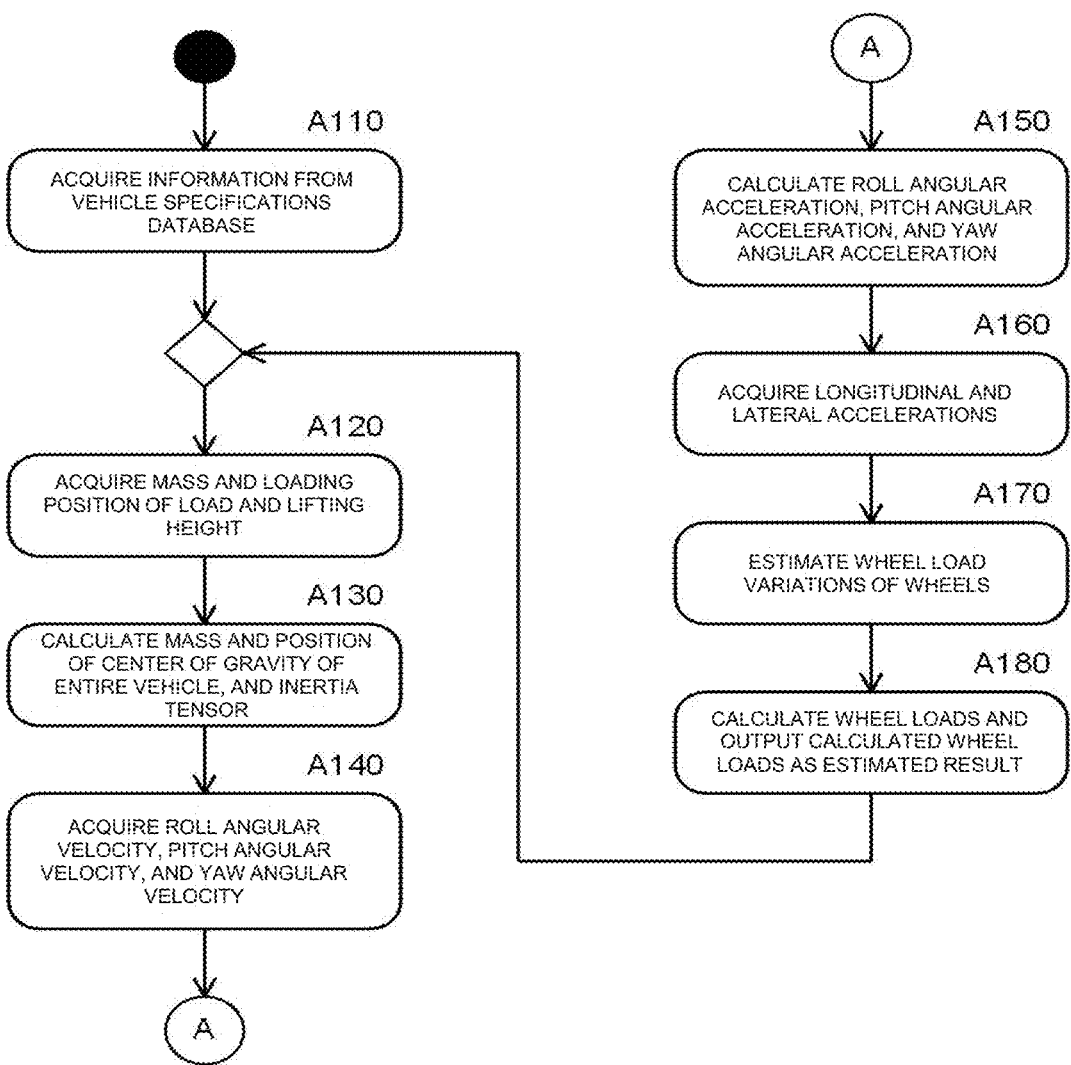
FIG. 14 is an activity diagram showing a flow of information processing executed by the wheel load estimation device 100 when an IMU 200 is used.

FIG. 14 is an activity diagram showing a flow of information processing executed by the wheel load estimation device 100 when the IMU 200 is used. The following will be described along activities in the activity diagram.

The control unit 110 acquires the roll center $h_R$, the mass $M_\beta$, the static loads $FL_{z0}$, $FR_{z0}$, $RL_{z0}$, $RR_{z0}$ of the wheels, the structure of each of the component parts including its shape and mass $m_j$, information including the arrangement of the wheels, and roll stiffness distributions $\alpha f$, $\alpha r$ from the vehicle specifications database 28 (activity A110).

In activity A110, for example, the following two-stage information processing is executed. (1) The control unit 110 reads out pieces of information stored in the vehicle specifications database 28. (2) The control unit 110 stores (holds) the pieces of information in the storage unit 120.

Next, the control unit 110 acquires the mass $M_\alpha$ of the load 602 loaded on the fork 603 and the loading position of the load 602, and also acquires the lifting height (activity A120).

In activity A120, for example, the following two-stage information processing is executed. (1) The control unit 110 acquires the mass $M_\alpha$ of the load 602, the loading position of the load 602, and the lifting height from the detection values by the pressure sensor 300 and the encoder 400. (2) The control unit 110 stores pieces of information relating to the mass $M_\alpha$ of the load 602, the loading position of the load 602, and the lifting height in the storage unit 120.

Next, the control unit 110 calculates the mass $M_{all}$ and the position 600A of the center of gravity $CG_{all}$ of the entire vehicle 600, and the positions 601A, 602A, 603A, 604A, 605A of the centers of gravity of the component parts j, and further calculates the inertia tensor $J_{all}$ (activity A130).

In activity A130, for example, the following three-stage information processing is executed. (1) The control unit 110 reads out the pieces of information acquired in activities A110 and A120 from the storage unit 120. (2) The control unit 110 executes a calculation process to calculate the mass $M_{all}$ and the position 600A of the center of gravity $CG_{all}$ of the entire vehicle 600, the positions 601A, 602A, 603A, 604A, 605A of the centers of gravity of the component parts j, and the inertia tensor $J_{all}$. (3) The control unit 110 stores pieces of information obtained by the calculation in the storage unit 120.

In other words, the calculation unit calculates the position of the center of gravity of the vehicle 600. The calculation unit calculates an inertia value relating to the inertia at the position 600A of the center of gravity of the vehicle 600 from the position 600A of the center of gravity of the vehicle 600 and the mass $M_{all}$ of the vehicle 600. Through activities A110 and A120, the control unit 110 calculates the mass $M_{all}$ of the entire vehicle 600 including the load 602, the inertia tensor $J_{all}$, the position $h_{CG}$ of the center of gravity $CG_{all}$ of the entire vehicle 600 in the z-axis direction, the distances tl and tr of the left and right wheels relative to $CG_{all}$ in the y-axis direction, and the distances lf and lr of the front and rear wheels relative to $CG_{all}$ in the x-axis direction.

Next, the control unit 110 acquires the roll angular velocity P, the pitch angular velocity Q, and the yaw angular velocity R (activity A140).

In activity A140, for example, the following two-stage information processing is executed. (1) The control unit 110 acquires the roll angular velocity P, the pitch angular velocity Q, and the yaw angular velocity R from the detection values by the IMU 200. (2) The pieces of information relating to the roll angular velocity P, the pitch angular velocity Q, and the yaw angular velocity R are stored in the storage unit 120.

Next, the control unit 110 calculates the roll angular acceleration $\dot{P}$, the pitch angular acceleration $\dot{Q}$, and the yaw angular acceleration $\dot{R}$ (activity A150).

In activity A150, for example, the following three-stage information processing is executed. (1) The control unit 110 reads out the pieces of information relating to the roll angular velocity P, the pitch angular velocity Q, and the yaw angular velocity R stored in the storage unit 120. (2) The control unit 110 executes a calculation process by approximate differentiation to calculate the roll angular acceleration $\dot{P}$, the pitch angular acceleration $\dot{Q}$, and the yaw angular acceleration $\dot{R}$. (3) The control unit 110 stores pieces of calculated information in the storage unit 120.

Next, the control unit 110 acquires $S_{xCG}$ and $S_{yCG}$ which are the longitudinal and lateral accelerations, respectively, at the position of the center of gravity (activity A160).

In activity A160, for example, the following four-stage information processing is executed. (1) The control unit 110 acquires the longitudinal acceleration $S_x$ and the lateral acceleration $S_y$ from the detection values by the IMU 200. (2) The control unit 110 reads out the roll angular velocity P, the pitch angular velocity Q, the yaw angular velocity R, the roll angular acceleration $\dot{P}$, the pitch angular acceleration $\dot{Q}$, and the yaw angular acceleration $\dot{R}$ stored in the storage unit 120. (3) The control unit 110 calculates relative distances $\Delta x_{sf}$, $\Delta y_{sf}$, $\Delta z_{sf}$ between the mounting position $(x_{sf}, y_{sf}, z_{sf})$ of the IMU 200 on the vehicle 600 in the vehicle coordinate system stored in the vehicle specifications database 28 and the position of the center of gravity $CG_{all}$ of the vehicle 600. (4) The longitudinal acceleration $S_{xCG}$ and the lateral acceleration $S_{yCG}$ at the position of the center of gravity are calculated based on the acquired accelerations $S_x$, $S_y$, the angular velocities P, Q, R, the angular accelerations $\dot{P}$, $\dot{Q}$, $\dot{R}$, and the relative distances $\Delta x_{sf}$, $\Delta y_{sf}$, $\Delta z_{sf}$, and pieces of information relating to $S_{xCG}$, $S_{yCG}$ are stored in the storage unit 120.

Next, the control unit 110 estimates the wheel load variations $\Delta FL_z$, $\Delta FR_z$, $\Delta RL_z$, $\Delta RR_z$ of the wheels (activity A170).

In activity A170, for example, the following four-stage information processing is executed. (1) The control unit 110 executes a calculation process to calculate a distance $(h_{CG}-h_R)$ between $CG_{all}$ and the roll center $h_R$ in the z-axis direction. (2) The control unit 110 reads out $S_{xCG}$, $S_{yCG}$, P, Q, R, $\dot{P}$, $\dot{Q}$, $\dot{R}$, $M_{all}$, $J_{all}$, $h_{CG}$, $N_v$, $t_l$, $t_r$, $l_f$, $l_r$, $\alpha_f$, $\alpha_r$ stored in the storage unit 120. (3) The control unit 110 estimates the wheel load variations $\Delta FL_z$, $\Delta FR_z$, $\Delta RL_z$, $\Delta RR_z$ based on the information calculated in (1) and the pieces of information read out in (2). (4) The control unit 110 stores the wheel load variations $\Delta FL_z$, $\Delta FR_z$, $\Delta RL_z$, $\Delta RR_z$ in the storage unit 120.

In other words, the estimation unit estimates the wheel loads acting on the wheels of the vehicle 600 based on the inertia value relating to the inertia at the position of the center of gravity of the vehicle 600, at least one of the angular velocity and the angular acceleration around the three axes of the vehicle 600, the inertial force generated in the vehicle 600, and a predetermined estimation equation.

Next, the control unit 110 calculates the wheel loads and outputs the calculated wheel loads as an estimated result (activity A180).

In activity A180, for example, the following four-stage information processing is executed. (1) The control unit 110 reads out the wheel load variations $\Delta FL_z$, $\Delta FR_z$, $\Delta RL_z$, $\Delta RR_z$ stored in the storage unit 120. (2) The control unit 110 reads out the static loads $FL_{z0}$, $FR_{z0}$, $RL_{z0}$, $RR_{z0}$ of the wheels stored in the storage unit 120. (3) The control unit 110 executes a calculation process to calculate the wheel loads. (4) The control unit 110 outputs the calculated wheel loads.

Next, the control unit 110 proceeds to processing of activity A120. That is, while the vehicle 600 is traveling, the control unit 110 repeatedly executes processing of activity A120 to activity A180. The output wheel load estimation result is used for control such as overturn prevention of the vehicle 600.

In other words, the acquisition unit continuously acquires the parameters output from the IMU 200. The calculation unit continuously calculates the inertial force generated in the vehicle 600 based on the continuously acquired parameters and the mass of the vehicle 600. The estimation unit continuously estimates the wheel load acting on each wheel of the vehicle 600 in time series based on the continuously calculated inertial force and a predetermined estimation equation.

Second Embodiment

Next, a second embodiment of the present disclosure will be described.

Section 5. Hardware Configuration

In Section 5, the hardware configuration of the second embodiment will be described.

In Section 5, a case where the vehicle 600 is a three-wheel forklift truck is described. In the following, part of the hardware configuration different from the first embodiment in which the vehicle 600 is a four-wheel forklift truck will be described, and descriptions of the part of the hardware configuration similar to that of the first embodiment will be omitted as appropriate.

The configuration of the vehicle 600 of the second embodiment is generally similar to that of the first embodiment illustrated in FIG. 1, but differs in that the vehicle 600 has one rear wheel. In the second embodiment, as an example of the vehicle 600 including a factor that cause variations in the center of gravity, estimation of the wheel loads of a forklift truck equipped with two front wheels, namely front left and front right wheels, and one rear wheel will be described.

Section 6. Functional Configuration

In Section 6, a functional configuration of the second embodiment will be described.

The wheel load variation estimation unit 34 estimates wheel load variations $\Delta FL_z$, $\Delta FR_z$, $\Delta R_z$ using the distances tl, tr in the y-axis direction between the front left and front right wheels and distances lf, lr in the x-axis direction between the front and rear wheels.

The wheel load calculation unit 36 calculates wheel loads FLz, FRz, Rz by adding the wheel load variations $\Delta FLz$, $\Delta FRz$ of the front wheels and the wheel load variation $\Delta R_z$ of the rear wheel estimated by the wheel load variation estimation unit 34 and static loads $FL_{z0}$, $FR_{z0}$, Rz0 of the wheels stored in the vehicle specifications database 28, and outputs calculated wheel loads as estimation results.

Section 7. Principle

In the Section 7, a principle of the second embodiment will be described.

Considering that the three-wheel forklift truck has one rear wheel located in the center of the vehicle, the roll moment $L_V$ and pitch moment $M_v$ in equations (18) and (19) are expressed as equations (24) and (25), respectively.

$$L_v = L + \Delta FL_z \cdot t_l - \Delta FR_z = M_{all} \cdot S_{yCG} \cdot (h_{CG} - h_R) + \Delta FL_z \cdot t_l - FR_z \cdot t_r \quad (24)$$

$$M_v = M - (\Delta FL_z + \Delta FR_z) \cdot l_f + \Delta R_z \cdot l_r = \quad (25)$$

$$M_{all} \cdot S_{xCG} \cdot h_{CG} - (\Delta FL_z + \Delta FR_z) \cdot l_f + \Delta R_z \cdot l_r$$

The sum of the wheel load variations of the wheels is expressed as equation (26), similarly to equation (21).

$$\Delta FL_z + \Delta FR_z + \Delta R_z = 0 \quad (26)$$

In the three-wheel forklift truck, there are three wheel loads to be estimated, and the wheel load variations of the three wheels can be calculated using three balance equations: the roll moment, the pitch moment, and the sum of the wheel load variations. s. The roll stiffness distributions $a_f$, $a_r$, which are necessary in the first embodiment, are unnecessary in the second embodiment. From equations (24) to (26), equation (22) can be rewritten for the three-wheel forklift truck as equation (27).

$$
\begin{bmatrix} \Delta FL_{z(i)} \\ \Delta FR_{z(i)} \\ \Delta R_{z(i)} \\ N_{v(i)} \end{bmatrix} = \begin{bmatrix} t_l & -t_r & 0 & 0 \\ -l_f & -l_f & l_r & 0 \\ 0 & 0 & 0 & 1 \\ 1 & 1 & 1 & 0 \end{bmatrix}^{-1} \cdot \quad (27)
$$

$$
\left( J_{all}^* \cdot \begin{bmatrix} \dot{P}_{(i)} \\ \dot{Q}_{(i)} \\ \dot{R}_{(i)} \\ 0 \end{bmatrix} + \begin{bmatrix} 0 & -R_{(i)} & Q_{(i)} & 0 \\ R_{(i)} & 0 & -P_{(i)} & 0 \\ -Q_{(i)} & P_{(i)} & 0 & 0 \\ 0 & 0 & 0 & 0 \end{bmatrix} \cdot J_{all}^* \cdot \begin{bmatrix} P_{(i)} \\ Q_{(i)} \\ R_{(i)} \\ 0 \end{bmatrix} + \right.
$$

$$
\left. \begin{bmatrix} -M_{all} \cdot G_{yCG(i)} \cdot (h_{CG} - h_R) \\ M_{all} \cdot G_{xCG(i)} \cdot h_{CG} \\ 0 \\ 0 \end{bmatrix} \right)
$$

The wheel loads $FL_z$, $FR_z$, $R_z$ are calculated by adding the wheel load variations obtained from equation (27) and the static loads $FL_{z0}$, $FR_{z0}$, $R_{z0}$ of the wheels stored in the vehicle specifications database 28. In addition, $J_{all}^*$ in equation (27) is obtained by transforming equation (6) and expressed by equation (28).

$$
J_{all}^* = \begin{bmatrix} \sum_{j=1}^{N} m_j \cdot (\Delta y_j^2 + \Delta z_j^2) + J_A & -\sum_{j=1}^{N} m_j \cdot (\Delta x_j + \Delta y_j) & -\sum_{j=1}^{N} m_j \cdot (\Delta x_j + \Delta z_j) & 0 \\ -\sum_{j=1}^{N} m_j \cdot (\Delta x_j + \Delta y_j) & \sum_{j=1}^{N} m_j \cdot (\Delta x_j^2 + \Delta z_j^2) + J_B & -\sum_{j=1}^{N} m_j \cdot (\Delta y_j + \Delta z_j) & 0 \\ -\sum_{j=1}^{N} m_j \cdot (\Delta x_j + \Delta z_j) & -\sum_{j=1}^{N} m_j \cdot (\Delta y_j + \Delta z_j) & \sum_{j=1}^{N} m_j \cdot (\Delta x_j^2 + \Delta y_j^2) & 0 \\ 0 & 0 & 0 & 0 \end{bmatrix} \quad (28)
$$

Section 8. Information Processing Method

In Section 8, a method of information processing executed by the wheel load estimation device 100 according to the second embodiment will be described, focusing on part different from that of the first embodiment.

An activity diagram showing the flow of information processing executed by the wheel load estimation device 100 of the second embodiment using the IMU 200 is the same as the activity diagram for the first embodiment shown in FIG. 14, and, therefore, the activity diagram for the second embodiment is omitted. However, since the second embodiment deals with the three-wheeled forklift truck, information processing is slightly different from that for the four-wheeled forklift truck. In the following, part of the information processing different from that in the first embodiment will be described, and the same description will be omitted as appropriate.

The control unit 110 acquires pieces of information including the roll center $h_R$, mass $M_\beta$, the static loads $FL_{z0}$, $FR_{z0}$ of the front wheels, the static load $R_{z0}$ of the rear wheel, the structure of each of the component parts including its shape and mass $m_j$, and the arrangement of the wheels from the vehicle specifications database 28 (activity A110).

The control unit 110 calculates the mass $M_{all}$ of the entire vehicle 600 including the load 602, the inertia tensor $J_{all}$, the position $h_{CG}$ of the center of gravity $CG_{all}$ of the entire vehicle 600 in the z-axis direction, distances tl and tr of the front left and front right wheels relative to $CG_{all}$ in the y-axis direction, and the distances lf and lr of the front wheels and the rear wheel relative to $CG_{all}$ in the x-axis direction (activity A130).

The control unit 110 estimates the wheel load variations $\Delta FL_z$, $\Delta FR_z$, $\Delta R_z$ (activity A170).

In activity A170, for example, the following four-stage information processing is executed. (1) The control unit 110 executes a calculation process to calculate a distance $(h_{CG} - h_R)$ between $CG_{all}$ and the roll center $h_R$ in the z-axis direction. (2) The control unit 110 reads out $S_{xCG}$, $S_{yCG}$, P, Q, R, $\dot{P}$, $\dot{Q}$, $\dot{R}$, $M_{all}$, $J_{all}$, $h_{CG}$, $N_v$, $t_l$, $t_r$, $l_f$, $l_r$ stored in the storage unit 120. (3) The control unit 110 estimates the wheel load variations $\Delta FL_z$, $\Delta FR_z$, $\Delta R_z$ based on the information calculated in (1) and the various pieces of information read out in (2). (4) The control unit 110 stores the wheel load variations $\Delta FL_z$, $\Delta FR_z$, $\Delta R_z$ in the storage unit 120. In other words, the estimation unit estimates the wheel loads acting on the wheels of the vehicle 600 based on the inertia value relating to the inertia at the position of the center of gravity of the vehicle 600, at least one of the angular velocities and the angular accelerations about the three axes of the vehicle 600, the moment acting on the vehicle 600, and a predetermined estimation equation.

Next, the control unit 110 calculates the wheel loads and outputs the calculated wheel loads as an estimated result (activity A180).

In activity A180, for example, the following four-stage information processing is executed. (1) The control unit 110 reads out the wheel load variations $\Delta FL_z$, $\Delta FR_z$, $\Delta R_z$ stored in the storage unit 120. (2) The control unit 110 reads out the static loads $FL_{z0}$, $FR_{z0}$, $R_{z0}$ stored in the storage unit 120. (3) The control unit 110 executes a calculation process to calculate the wheel loads. (4) The control unit 110 outputs the calculated wheel loads.

Third Embodiment

Next, a third embodiment of the present disclosure will be described.

In a case where the wheel loads are estimated when the vehicle is traveling straight on the slope with little vertical motion, wheel load estimation can be performed using a wheel speed sensor, a one-axis gyroscope sensor, and an attitude angle sensor. A traveling straight state is detected based on, for example, the steering angle. The third embodiment is applicable to the four-wheel forklift truck or the three-wheel forklift truck, and the sum of the wheel loads of the left and right wheels for both the front and rear wheels is estimated. In the following, a part different from that in the first and second embodiments will be described, and the same description will be omitted as appropriate.

Section 9. Hardware Configuration

In Section 9, a hardware configuration of the third embodiment will be described. In the third embodiment, it is assumed that the vehicle behavior including the wheel speed, the pitch angular velocity, and the vehicle pitch angle, and the steering angle of the vehicle 600 are measured.

Figure 15:
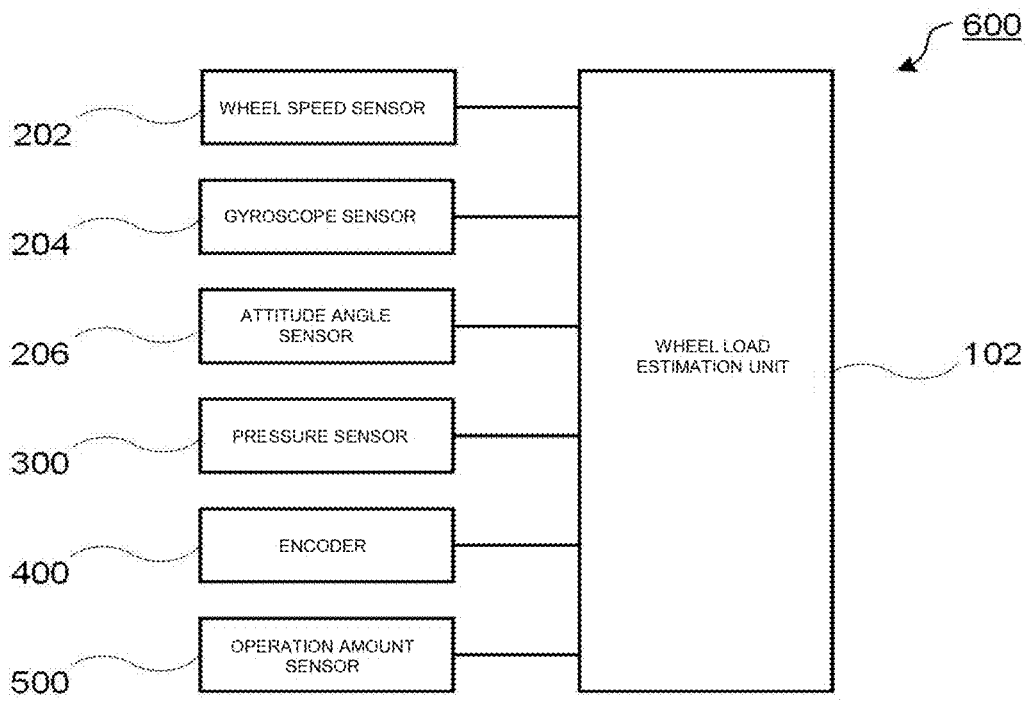
FIG. 15 is a block diagram illustrating a hardware configuration of the vehicle 600.

FIG. 15 is a block diagram illustrating a hardware configuration of the vehicle 600. The vehicle 600 includes a wheel load estimation device 102 and a detection unit. The detection unit may include a wheel speed sensor 202 that measures a wheel speed of either one or both of the front left wheel and the front right wheel, a gyroscope sensor 204 that measures the pitch angular velocity Q, the attitude angle sensor 206 that measures the vehicle pitch angle θ, the pressure sensor 300, the encoder 400, and the operation amount sensor 500. The wheel load estimation device 102 is connected to the wheel speed sensor 202, the gyroscope sensor 204, the attitude angle sensor 206, the pressure sensor 300, the encoder 400, and the operation amount sensor 500.

The wheel speed sensor 202 is provided by an electromagnetic pickup, a Hall sensor, or the like, and outputs a detection value of the rotation speed of the wheel.

The gyroscope sensor 204 is an angular velocity sensor of a MEMS, and outputs a detection value of the angular velocity about the y-axis of the vehicle coordinate system. The gyroscope sensor 204 is disposed at any suitable position in the vehicle 600.

The attitude angle sensor 206 may be composed of an IMU or the like, and outputs a detection value of the vehicle attitude angle.

Section 10. Functional Configuration

In Section 10, a functional configuration of the third embodiment will be described.

Figure 16:
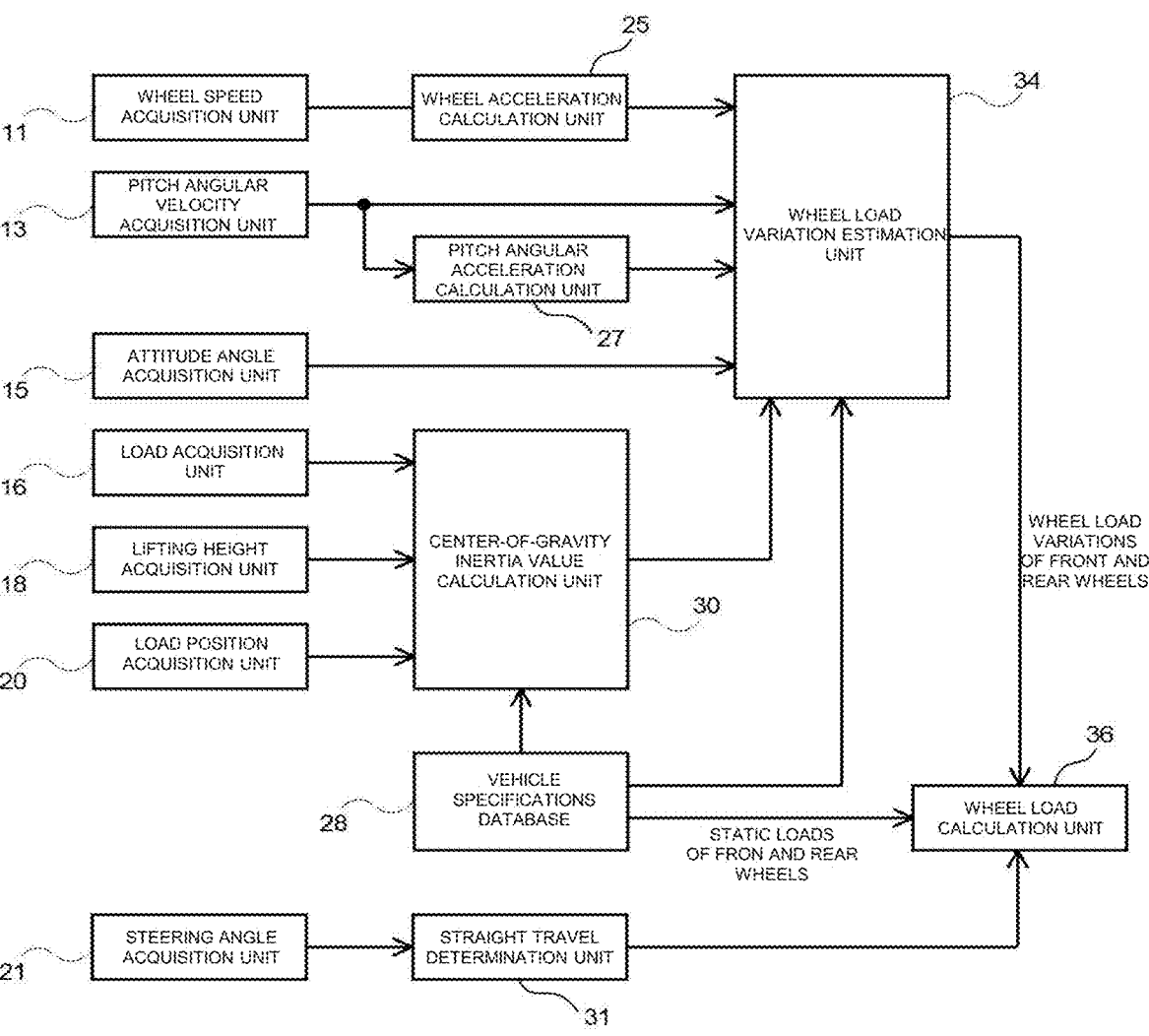
FIG. 16 is a block diagram illustrating functions realized by a wheel load estimation device 102 (control unit 110)

FIG. 16 is a block diagram illustrating functions performed by a wheel load estimation device 102 (control unit 110). Specifically, the wheel load estimation device 102 (control unit 110) includes a wheel speed acquisition unit 11, a pitch angular velocity acquisition unit 13, an attitude angle acquisition unit 15, a load acquisition unit 16, a lifting height acquisition unit 18, a load position acquisition unit 20, a steering angle acquisition unit 21, a wheel acceleration calculation unit 25, a pitch angular acceleration calculation unit 27, a center-of-gravity inertia value calculation unit 30, a straight travel determination unit 31, a wheel load variation estimation unit 34, and a wheel load calculation unit 36. The wheel load estimation device 102 include a vehicle specifications database 28, as a Read Only Memory (ROM). The vehicle specifications database 28 is provided as a separate storage unit from the storage unit 120.

In other words, the wheel load estimation device 102 (the control unit 110) includes an acquisition unit (the wheel speed acquisition unit 11, the pitch angular velocity acquisition unit 13, the attitude angle acquisition unit 15, the load acquisition unit 16, the lifting height acquisition unit 18, the loading position acquisition unit 20, the steering angle acquisition unit 21), a calculation unit (the wheel acceleration calculation unit 25, the pitch angular acceleration calculation unit 27, and the center-of-gravity inertia value calculation unit 30), an estimation unit (the wheel load variation estimation unit 34), and a determination unit (a straight travel determination unit 31. Furthermore, the wheel load estimation device 102 includes the vehicle specifications database 28 as the storage unit, and the control unit 110 of the wheel load estimation device 102 includes the wheel load calculation unit 36.

The wheel speed acquisition unit 11 receives a detection value output from the wheel speed sensor 202 and acquires the detection value as a wheel speed U. In a case where wheel speed sensors are attached to the left and right wheels, the average of the detection values by the wheel speed sensors is acquired as the wheel speed U.

The pitch angular velocity acquisition unit 13 receives the detection value output from the gyroscope sensor 204, and acquires the angular velocity of the vehicle 600 about the y-axis as the pitch angular velocity Q.

The attitude angle acquisition unit 15 receives the detection value output from the attitude angle sensor 206, and acquires the received detection value as the vehicle pitch angle θ of the vehicle 600 about the y axis.

Accordingly, the acquisition unit acquires the detection values output from the sensors as parameters. The parameters include at least one of the wheel speed and a first wheel acceleration of the vehicle, at least one of the angular velocity and the angular acceleration about the pitch axis of the vehicle, and the attitude angle about the pitch axis of the vehicle.

In the vehicle specifications database 28, various data related to the vehicle 600 are stored. Specifically, the vehicle specifications database 28 stores pieces of information including the mass $M_\beta$, the sum of the static loads of the front left and front right wheels and the rear left and rear right wheels Fz0, Rz0, the structure of each of the component parts including its shape and mass $m_j$, and the arrangement of the wheels.

The wheel acceleration calculation unit 25 calculates the wheel acceleration $\dot{U}$ by approximate differentiation of the wheel speed U acquired by the wheel speed acquisition unit 11.

The straight travel determination unit 31 determines whether the vehicle is traveling straight by comparing the steering angle acquired by the steering angle acquisition unit 21 with a threshold value.

When the straight travel determination unit 31 determines that the vehicle is travelling straight, the wheel load variation estimation unit 35 estimates the wheel load variations $\Delta F_z$, $\Delta R_z$ of the front and rear wheels using $h_{CG}$ calculated by the center-of-gravity inertia value calculation unit 30, the wheel acceleration $\dot{U}$ calculated by the wheel acceleration calculation unit 25, the pitch angular acceleration $\dot{Q}$ calculated by the pitch angular acceleration calculation unit 27, the vehicle pitch angle θ and the gravitational acceleration g acquired by the attitude angle acquisition unit 15, and the mass $M_{all}$ of the entire vehicle 600, the inertia tensor $J_{all}$, and the distances lf, lr of the wheels in the x-axis direction from the center of gravity $CG_{all}$ of the entire vehicle 600 calculated by the center-of-gravity inertia value calculation unit 30.

The wheel load calculation unit 36 calculates wheel loads $F_z$, $R_z$ of the front and rear wheels by adding the wheel load variations $\Delta F_z$, $\Delta R_z$ of the front and rear wheels estimated by the wheel load variation estimation unit 34 and the static loads $F_{z0}$, $R_{z0}$ of the front and rear wheels stored in the vehicle specifications database 28, and outputs calculated wheel loads as estimation results.

In this way, when the acquired parameters include the wheel acceleration $\dot{U}$ (a first wheel acceleration), the calculation unit calculates $\dot{U}-g\cdot\sin$ θ (a second wheel acceleration) by correcting the wheel acceleration $\dot{U}$ based on the first wheel acceleration and the vehicle pitch angle θ (the attitude angle). The second wheel acceleration is obtained by correcting the first wheel acceleration with a directional component based on the inclination direction of the vehicle 600 calculated from the parameters and the gravitational acceleration applied to the wheel acceleration $\dot{U}$ (the first wheel acceleration). Then, the calculation unit calculates the inertial force generated in the vehicle 600 based on the second wheel acceleration and the mass of the vehicle 600.

Section 11. Principle

In Section 11, a principle of the third embodiment will be described.

Where $\dot{U}$ is a value obtained by the approximate differentiation of the wheel speed U obtained by the sensor and V≈0, W≈0, P≈0, and R≈0 hold due to the vertical motion being small while the vehicle is travelling straight, the longitudinal acceleration $S_{xCG}$ is expressed by equation (29) from equation (11).

$$S_{xCG} = \dot{U} \tag{29}$$

The longitudinal force $X_v$ is given by equation (30) from equations (10) and (29).

$$X_v = M_{all}\cdot[\dot{U}-g\cdot\sin\theta] = M_{all}\cdot[S_{xCG}-g\cdot\sin\theta] \tag{30}$$

From equation (30), in calculating the longitudinal force $X_v$ when the wheel speed sensor is used, measurement values at the vehicle pitch angle θ are used. The moment M about point B is expressed by equation (31) using equation (30).

$$M = -X_v\cdot h_{CG} = -M_{all}\cdot[S_{xCG}-g\cdot\sin\theta]\cdot h_{CG} \tag{31}$$

From the sum of the wheel load variations $\Delta F_z$ of the front left and front right wheels and the sum of the wheel load variations $\Delta R_z$ of the rear left and rear right wheels, equation (26) becomes equation (32).

$$\Delta F_z + \Delta R_z = 0 \tag{32}$$

Using equations (31) and (32), similarly to equations (22) and (27), the sums of wheel load variations $\Delta F_z$, $\Delta R_z$ of the front wheels and the rear wheels can be calculated by equation (33).

$$\begin{bmatrix} \Delta F_{z(i)} \\ \Delta R_{z(i)} \end{bmatrix} = \begin{bmatrix} -l_f & l_r \\ 1 & 1 \end{bmatrix}^{-1}\cdot\begin{bmatrix} J_{all(2,2)}\cdot Q_{(i)} + M_{all}\cdot(S_{xCG}-g\cdot\sin\theta)\cdot h_{CG} \\ 0 \end{bmatrix} \tag{33}$$

$J_{all(2,2)}$ in equation (33) represents the element $J_{yy}$ in the second row and second column of equation (6).

Section 12. Information Processing Method

In Section 12, a method of information processing of the wheel load estimation device 102 in the third embodiment will be described. This information processing method is implemented as a wheel load estimation method on the front and rear wheels of a four-wheel or three-wheel forklift truck. In the following, parts different from the first and second embodiments will be described.

Figure 17:
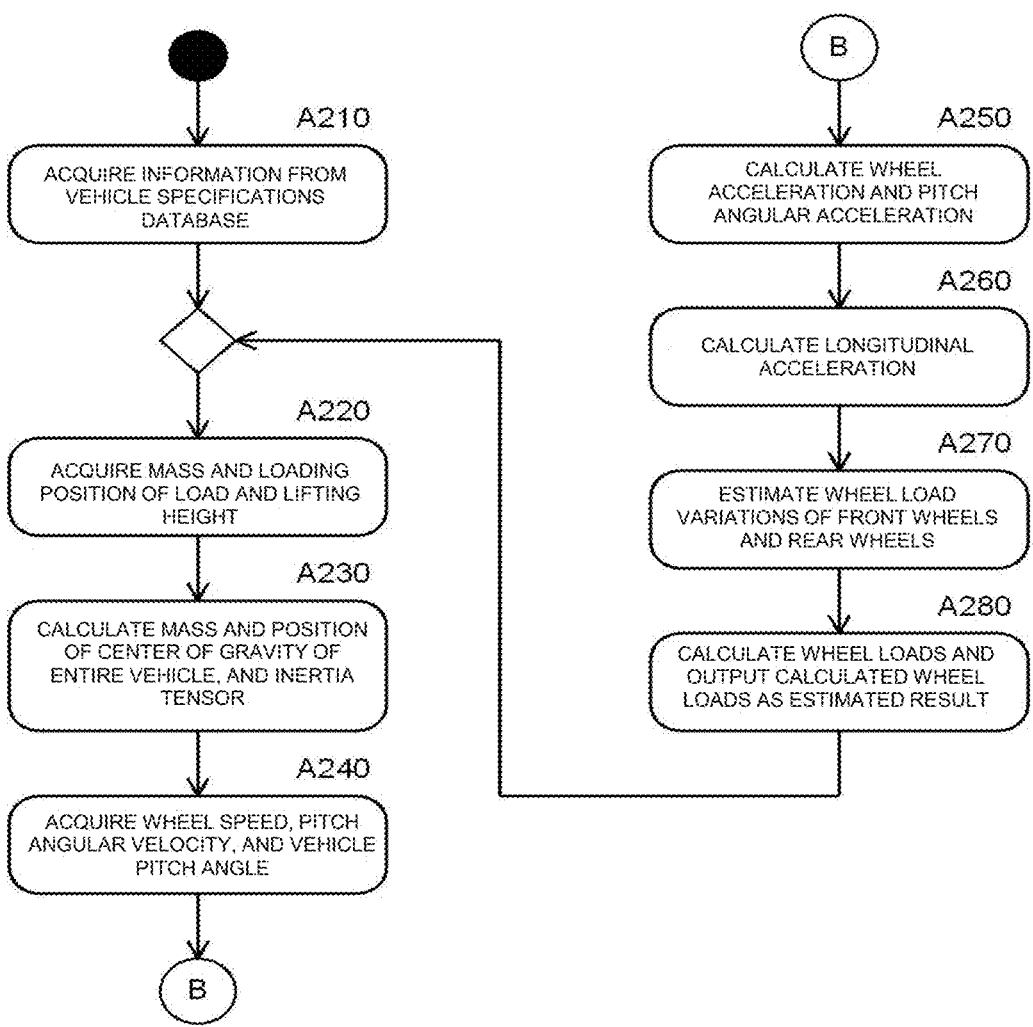
FIG. 17 is an activity diagram showing a flow of information processing executed by the wheel load estimation device 102 when a wheel speed sensor 202, a gyroscope sensor 204, and an attitude angle sensor 206 are used.

FIG. 17 is an activity diagram showing a flow of information processing executed by the wheel load estimation device 102 when the wheel speed sensor 202, the gyroscope sensor 204, and the attitude angle sensor 206 are used. The following description will be given along activities in the activity diagram.

The control unit 110 acquires pieces of information including the mass $M_β$, the sums of the static load sums Fz0, Rz0 of the front left and front right wheels and of the rear left and rear right wheels, the structure of each of the component parts including its shape and mass $m_j$, and the arrangement of the wheels from the vehicle specifications database 28 (activity A210).

The control unit 110 acquires the wheel speed U, the pitch angular velocity Q, and the vehicle pitch angle θ (activity A240).

In activity A240, for example, the following two-stage information processing is executed. (1) The control unit 110 acquires the wheel speed U from a detection value from the wheel speed sensor 202, the pitch angular velocity Q from a detection value from the gyroscope sensor 204, and the vehicle pitch angle θ from a detection value of the attitude angle sensor 206. (2) The acquired pieces of information of U, Q, and θ are stored in the storage unit 120.

Next, the control unit 110 calculates a differential value (wheel acceleration) $\dot{U}$ of the wheel speed U and the pitch angular acceleration $\dot{Q}$ (activity A250).

In activity A250, for example, the following two-stage information processing is executed. (1) The control unit 110 reads out the wheel speed U and the pitch angular velocity Q stored in the storage unit 120, and calculates the wheel acceleration $\dot{U}$ and the pitch angular acceleration $\dot{Q}$ by approximate differentiation. (2) The calculated $\dot{U}$ and $\dot{Q}$ are stored in the storage unit 120.

Next, the control unit 110 calculates the longitudinal acceleration $S_{xCG}$. The wheel acceleration $\dot{U}$ and the vehicle pitch angle $\theta$ stored in the storage unit 120 are read out, and the longitudinal acceleration $S_{xCG}$ is calculated (activity A260).

In activity A260, for example, the following two-stage information processing is executed. (1) The control unit 110 reads out the wheel acceleration $\dot{U}$ and the vehicle pitch angle $\theta$ stored in the storage unit 120, and calculates the longitudinal acceleration $S_{xCG}$ based on $\dot{U}$, $\theta$, and the gravitational acceleration g. (2) The calculated $S_{xCG}$ is stored in the storage unit 120.

Next, the control unit 110 estimates the wheel load variations $\Delta F_z$ of the front left and front right wheels and $\Delta R_z$ of the rear left and rear right wheels (activity A270).

In activity A270, for example, the following three-stage information processing is executed. (1) The control unit 110 reads out $S_{xCG}$, $\dot{Q}$, $M_{all}$, $J_{all}$, $h_{CG}$, lf, and lr stored in the storage unit 120. (2) Based on the pieces of information read out in (1), the wheel load variations $\Delta F_z$ the front left and front right wheels and $\Delta R_z$ of the rear left and rear right wheels are estimated. (3) The control unit 110 stores the wheel load variations $\Delta F_z$, $\Delta R_z$ in the storage unit 120

In other words, the estimation unit estimates the wheel loads acting on the front wheels and rear wheels of the vehicle 600 based on the inertia value relating to the inertia at the position of the center of gravity of the vehicle 600, at least one of the angular velocity and the angular acceleration about one axis of the vehicle 600, the moment acting on the vehicle 600, and a predetermined estimation equation.

Next, the control unit 110 calculates the sums of the wheel loads of the front left and front right wheels and the wheel loads of the rear left and rear right wheels and outputs the sum of the wheel loads as a wheel load estimation result (activity A280).

Section 13. Experimental Examples

In Section 13, an example of the experiment of the second embodiment will be described.

Figure 18:
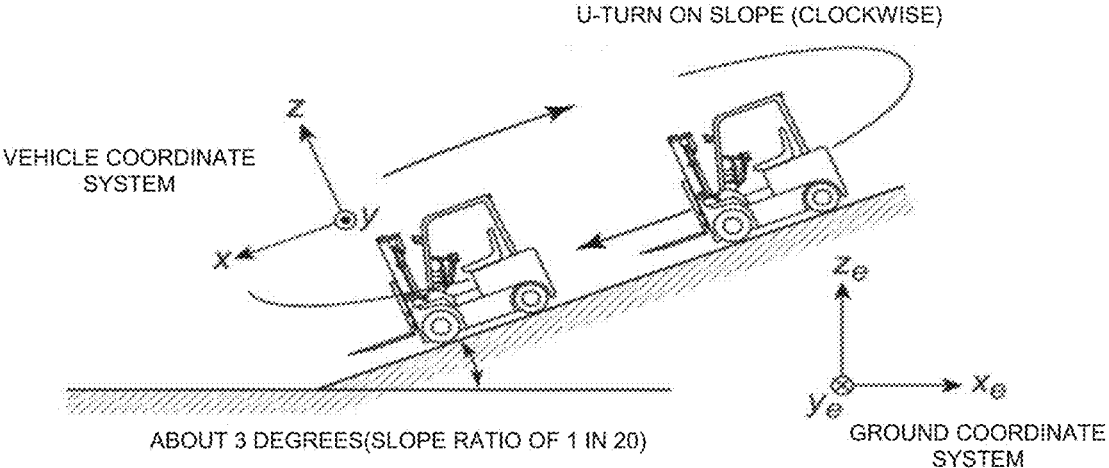
FIG. 18 is a view illustrating a state in which a three-wheel forklift truck equipped with the IMU 200 is traveling on a slope.
Figure 18:
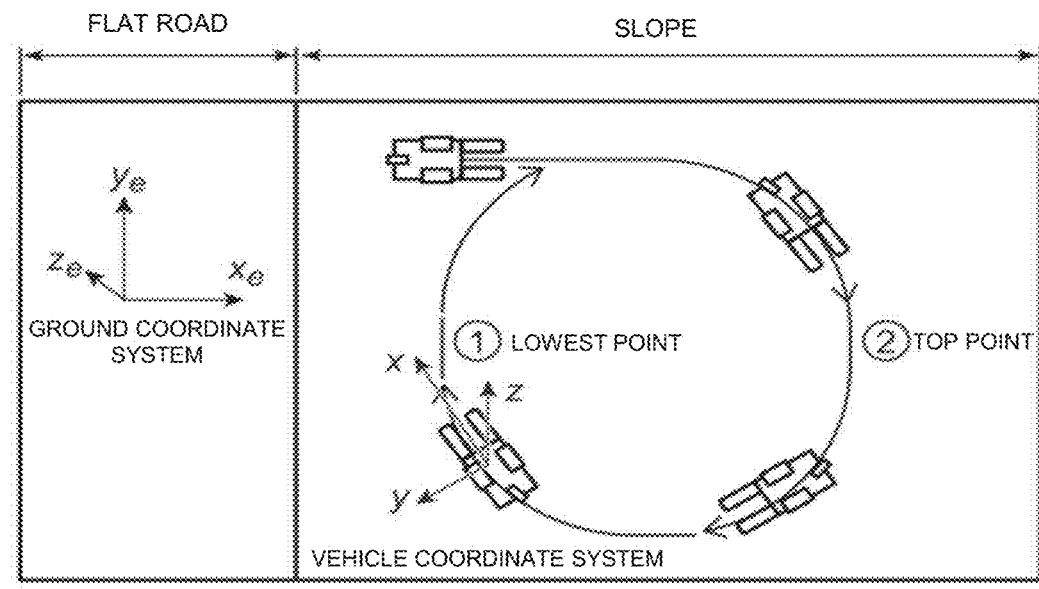
Figure 19:
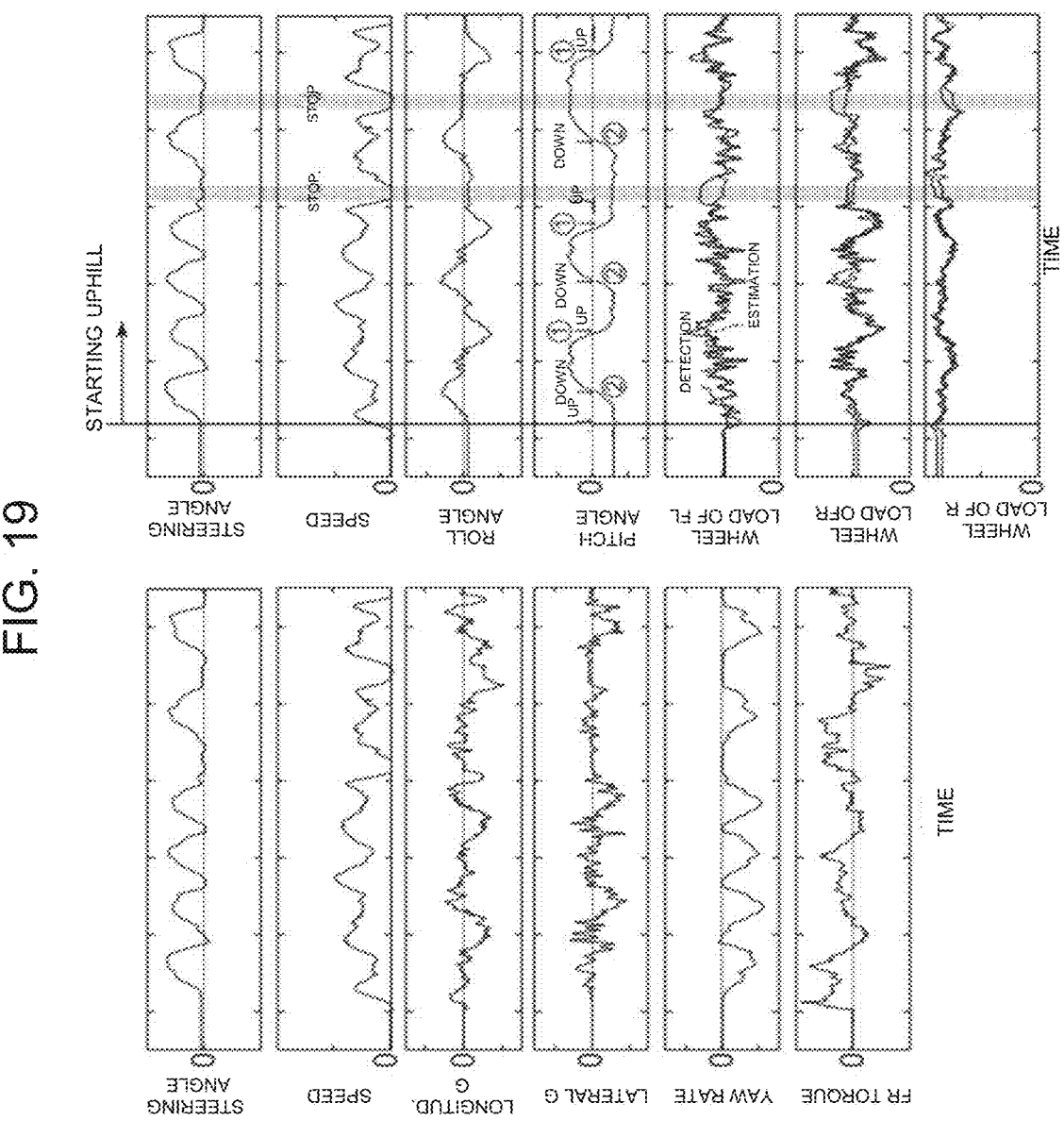
FIG. 19 is a chart showing a result of estimating the wheel loads of the three-wheel forklift truck in FIG. 18.

FIG. 18 is a view illustrating a state in which the three-wheel forklift truck equipped with the IMU 200 is traveling on the slope. FIG. 19 is a chart showing a result of estimation of the wheel loads of the three-wheel forklift truck in FIG. 18. More specifically, in FIGS. 18 and 19, the wheel loads of the three-wheel forklift truck are estimated based on equation (27) using actual vehicle measurement values of the longitudinal acceleration $S_x$, the lateral acceleration $S_y$, the roll angular velocity P, the pitch angular velocity Q, and the yaw angular velocity R using the IMU 200. In equation (27), $h_r$=0 holds. In addition, the roll angular acceleration $\dot{P}$, the pitch angular acceleration $\dot{Q}$, and the yaw angular acceleration $\dot{R}$, which are obtained by approximate differentiation of the angular velocities P, Q, R about the axes as measured on an actual vehicle, showed large vibration components and are therefore respectively set to 0 (P=0, Q=0, R=0).

As shown in FIG. 19, even in a situation where the vehicle roll angle and the pitch angle are generated, the estimated wheel loads and the wheel loads measured on the actual vehicle substantially matched, and the wheel loads were successfully estimated with high accuracy.

Fourth Embodiment

Next, a fourth embodiment of the present disclosure will be described. In the fourth embodiment, a case in which the motion of the vehicle 600 is restricted using the wheel loads estimated by the wheel load estimation device 100 will be described with a forklift truck equipped with a fork 603 as an example of the vehicle 600.

Section 14. Functional Configuration

In Section 14, a functional configuration of the fourth embodiment will be described.

Figure 20:
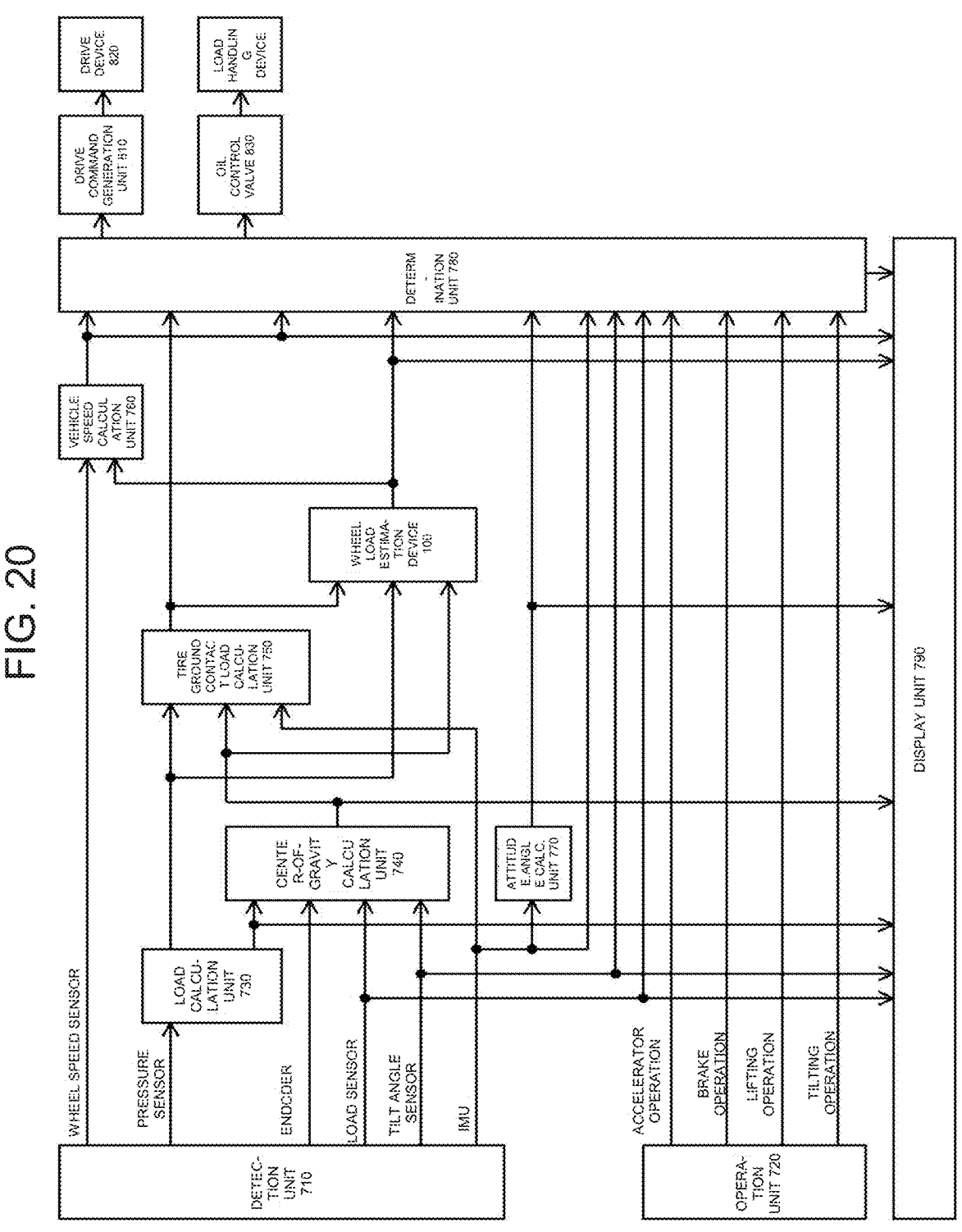
FIG. 20 is a block diagram illustrating functions realized by the vehicle 600.
Figure 21:
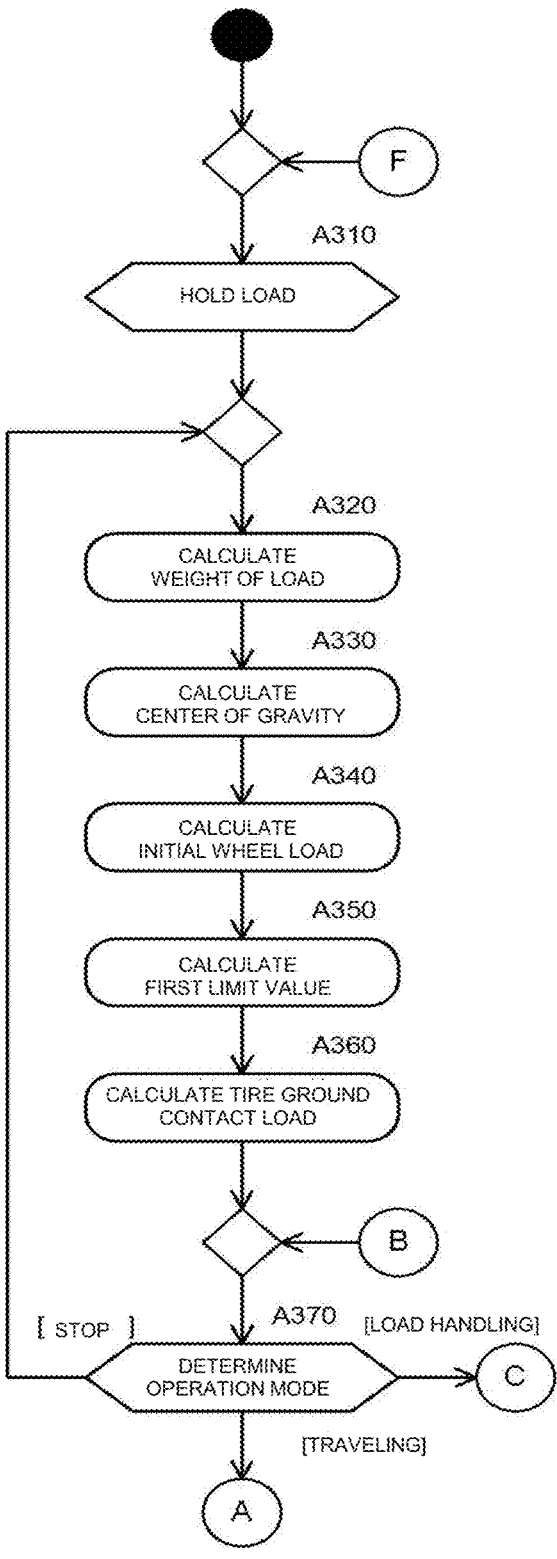
FIG. 21 is an activity diagram showing a flow of information processing executed by the vehicle 600.
Figure 22:
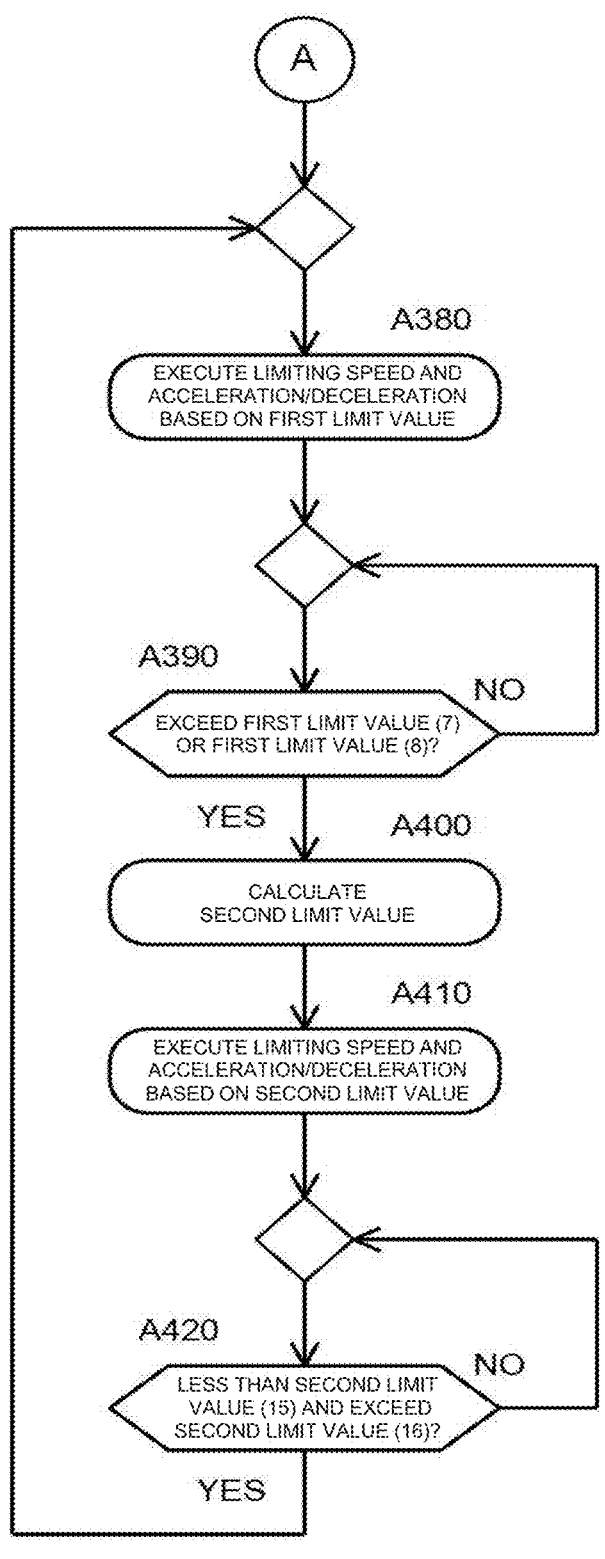
FIG. 22 is an activity diagram showing a flow of information processing executed by the vehicle 600.
Figure 23:
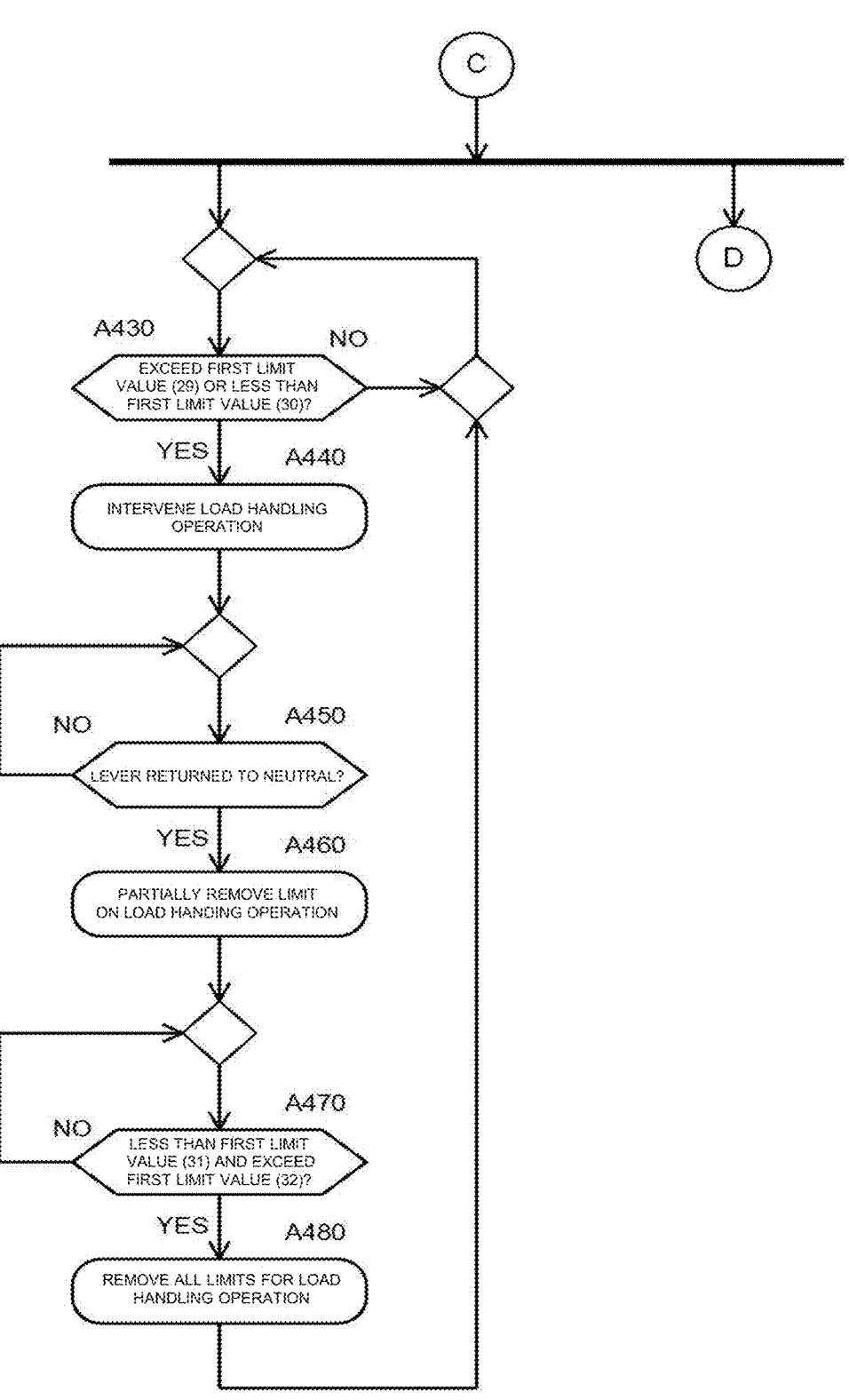
FIG. 23 is an activity diagram showing a flow of information processing executed by the vehicle 600.
Figure 24:
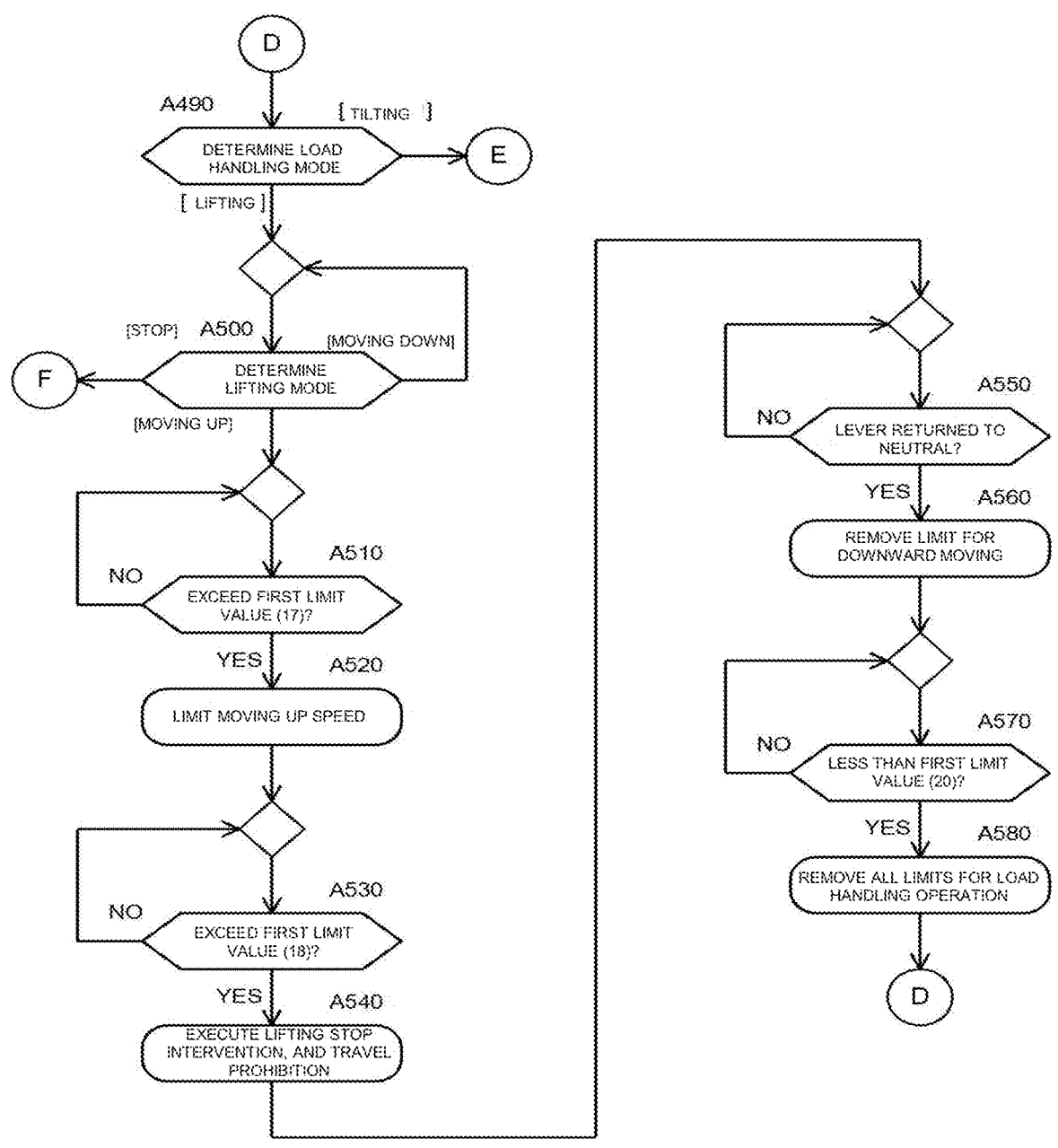
FIG. 24 is an activity diagram showing a flow of information processing executed by the vehicle 600.
Figure 25:
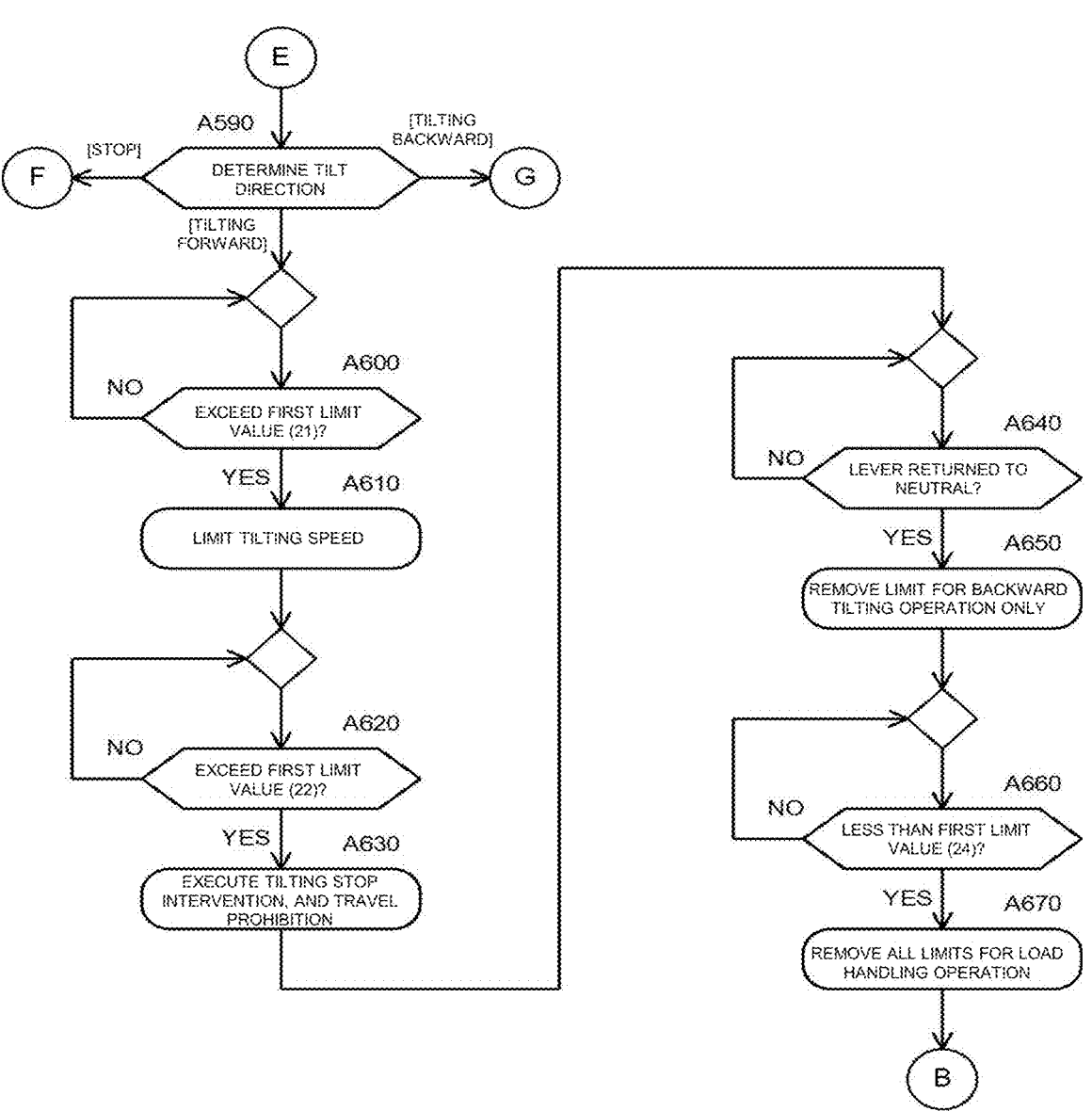
FIG. 25 is an activity diagram showing a flow of information processing executed by the vehicle 600.
Figure 26:
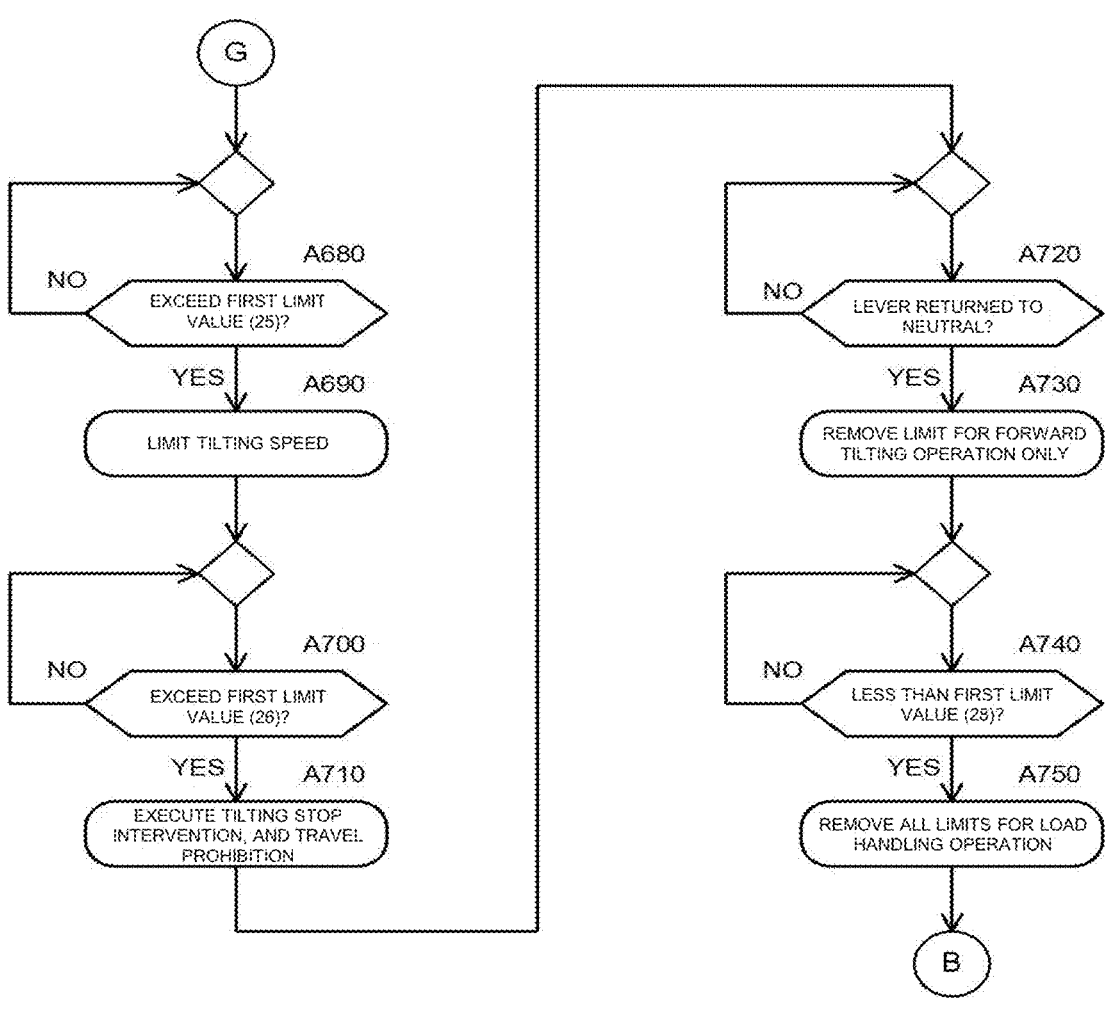
FIG. 26 is an activity diagram showing a flow of information processing executed by the vehicle 600.

FIG. 20 is a block diagram illustrating functions implemented in the vehicle 600. The vehicle 600 includes a detection unit 710, an operation unit 720, a load calculation unit 730, a center-of-gravity calculation unit 740, a tire ground contact load calculation unit 750, a vehicle speed calculation unit 760, an attitude angle calculation unit 770, a determination unit 780, a display unit 790, a drive command generation unit 810, a drive device 820, an oil control valve 830, a load handling device 840, and the wheel load estimation device 100.

The detection unit 710 includes a wheel speed sensor 202 for detecting the vehicle speed, a pressure sensor 300 for detecting the weight of the load 602, a load sensor for measuring a tilt thrust that tilts the mast, and an IMU 200.

The operation unit 720 transmits operations by an operator, such as an operation of load handling levers (moving the fork up and down, tilting the mast, and the like) and an operation of the accelerator pedal and brake pedal when the vehicle 600 travels forward/backward and braking, to the vehicle 600.

The load calculation unit 730 calculates a weight of the load 602 based on the pressure sensor 300.

The center-of-gravity calculation unit 740 calculates the center of gravity of the entire vehicle 600 and the center of gravity of the load 602 based on information from a tilt angle sensor, the load sensor for measuring a tilt thrust, the encoder 400, the weight of the load 602 calculated by the load calculation unit 730, and data from the vehicle specifications database 28.

The tire ground contact load calculation unit 750 calculates the tire ground contact load (static load) when the vehicle is at a stop, based on information from the load calculation unit 730, the center-of-gravity calculation unit 740, and the vehicle specifications database 28.

The vehicle speed calculation unit 760 calculates and corrects the speed of the vehicle 600 based on information from the tire ground contact load calculation unit 750, the wheel speed sensor 202 included in the detection unit 710, and tire specifications such as the dynamic load radius.

The attitude angle calculation unit 770 calculates the tilt angles of the vehicle 600 in the front-rear direction and the left-right direction based on the IMU 200 and the calculation results by the vehicle speed calculation unit 760.

The determination unit 780 calculates limit values for the vehicle speed and acceleration/deceleration of the vehicle 600, an allowable load lifting height, and an allowable mast tilting angle based on results of the center of gravity calculation, the load calculation, the attitude angle calculation, the vehicle speed calculation, the measurement results by the detection unit 710, and the operation results of the operation unit 720. The determination unit 780 determines whether or not intervention is required for load handling operation and travel control. The determination unit 780 issues a control command to the drive device 820 and the load handling device 840. The determination unit 780 gives notification about various limit values and limit states to the display unit 790.

The display unit 790 displays the detection result by the detection unit 710, the limit value calculated by the determination unit 780, the limit state, and the like.

The drive command generation unit 810 generates a command signal for the drive device 820 based on the result output by the determination unit 780. The drive command generation unit 810 transmits the command signal to the drive device 820.

The drive device 820 drives the vehicle 600 based on the command signal transmitted by the drive command generation unit 810. The drive device 820 drives the vehicle 600 to travel. The drive device 820 includes a motor, an engine, and the like.

The oil control valve 830 controls hydraulic pressure based on the output result by the determination unit 780.

The load handling device 840 is connected to the oil control valve 830 via a hydraulic circuit, and operates in response to the controlled hydraulic pressure.

The wheel load estimation device 100 estimates the wheel loads acting on the wheels of the vehicle 600 by using the logic exemplified in the first to third embodiments.

Section 15. Information Processing Method

In Section 15, information processing methods executed by the vehicle 600 will be described.

FIGS. 21 to 26 each are an activity diagram showing a flow of information processing executed by the vehicle 600. The following description will be given along activities in the activity diagram. Here, entities that execute activities are indicated as functional units, and the functional units may be collectively referred to as the control unit 110.

First, the vehicle 600 holds the load 602 (activity A310). In activity A310, the detection unit 710 measures the geometry of the fork 603, the outer mast 604, and the inner mast 605 (activity A310).

Next, the load calculation unit 730 calculates the weight of the load 602 based on the pressure sensor 300 (activity A320).

Subsequently, the center-of-gravity calculation unit 740 calculates the center of gravity of the load 602 and the center of gravity of the entire vehicle 600 based on information from the tilt angle sensor, the load sensor for measuring the tilt thrust, the encoder 400, the weight of the load 602 calculated by the load calculation unit 730, and information from the vehicle specifications database 28 (activity A330).

Next, the tire ground contact load calculation unit 750 calculates the wheel loads when the vehicle 600 is at a stop, i.e., initial wheel loads, based on information from the load calculation unit 730, the center-of-gravity calculation unit 740, and the vehicle specifications database 28 (activity A340).

Next, the determination unit 780 calculates the following parameters (hereinafter also referred to as a "first limit value") based on the calculated weight of the load 602 (activity A350): (1) a vehicle speed limit value when the vehicle 600 travels forward; (2) a vehicle speed limit value when the vehicle 600 travels backward; (3) an acceleration limit value when the vehicle 600 travels forward; (4) an acceleration limit value when the vehicle 600 travels backward; (5) a deceleration limit value when the vehicle 600 travels forward; (6) a deceleration limit value when the vehicle 600 travels backward; (7) a limit value for an attitude angle change amount in the pitch direction when the vehicle 600 travels; (8) an allowable value for a tire ground contact load reduction amount when the vehicle 600 travels; (17) a lifting height threshold for limiting a speed of moving up during a lifting upward operation; (18) a lifting height threshold for imposing a lifting stop limit during the lifting upward operation; (19) a lifting speed of the load 602 when the lifting stop limit is imposed during the lifting upward operation; (20) a lifting height threshold when the lifting stop limit is removed after a load handling operation is intervened; (21) a tilting angle for limiting a tilting forward speed during a tilting forward operation; (22) a tilting angle for imposing a tilting forward stop limit during the tilting forward operation; (23) a speed limit when the tilting speed limit is imposed during the tilting forward operation, (24) a limit removal threshold angle for removing the tilting forward stop limit when the mast is tilted backward after the tilting speed limit is imposed and tilting forward is stopped; (25) a tilting angle for limiting a tilting backward speed during a tilting backward operation; (26) a tilting angle for imposing a tilting backward stop limit during the tilting backward operation; (27) a speed limit when the tilting speed limit is imposed during the tilting backward operation; (28) a limit removal threshold angle for removing the tilting backward stop limit when the mast is tilted forward after the tilting speed limit is imposed and tilting backward is stopped during the tilting backward operation; (29) an angle threshold (angle change amount) for the attitude angle used for the load handling operation intervention in monitoring a change in the wheel load and the angle during the load handling operation; (30) a wheel load threshold (wheel load change amount) used for the load handling operation intervention in monitoring a change in the wheel load and the angle during the load handling operation; (31) an angle threshold for the attitude angle used for removing the load handling operation intervention after the load handling operation intervention is imposed in monitoring changes in the wheel load and the angle during the load handling operation; and (32) a wheel load threshold used for removing the load handling operation intervention after the load handling operation intervention is imposed in monitoring changes in the wheel load and the angle during the load handling operation.

Next, the wheel load estimation device 100 estimates the wheel loads acting on the wheels of the vehicle 600 (activity A360).

Next, the determination unit 780 determines an operation mode of the vehicle 600 (a stop, a travelling in progress, or a load handling operation in progress) (activity A370). When it is determined that the vehicle 600 is at a stop, the control unit 110 proceeds to processing of activity A320. When it is determined that the vehicle 600 is travelling, the control unit 110 proceeds to processing of activity A380. When it is determined that the vehicle 600 is handling a load, the control unit 110 proceeds to processing of activities A430 and A490.

Next, a case where the vehicle 600 is traveling will be described. The determination unit 780 executes processing of limiting the speed of the vehicle 600 and processing of limiting the acceleration/deceleration of the vehicle 600 based on the calculated first limit values (activity A380). That is, the determination unit 780 executes travelling processing for the vehicle 600 with the limit values calculated as the first limit values (1) to (6) as the upper limit values.

Next, the determination unit 780 determines whether the attitude angle change amount exceeds the first limit value (7) or the tire ground contact load reduction amount exceeds the first limit value (8) (activity A390). When the attitude angle change amount exceeds the first limit value (7) or the tire ground contact load reduction amount exceeds the first limit value (8) (YES in activity A390), the control unit 110 proceeds to processing of activity A400. If the attitude angle change amount is equal to or less than the first limit value (7) and the tire ground contact load reduction amount is equal to or less than the first limit value (8) (NO in activity A390), the control unit 110 continues processing of activity A390.

Next, the determination unit 780 calculates the following parameters (hereinafter also referred to as the "second limit value") based on the calculated weight of the load 602 (activity A400): (9) a vehicle speed limit value when the vehicle 600 travels forward; (10) a vehicle speed limit value when the vehicle 600 travels backward; (11) an acceleration limit value when the vehicle 600 travels forward; (12) an acceleration limit value when the vehicle 600 travels backward; (13) a deceleration limit value when the vehicle 600 travels forward; (14) a deceleration limit value when the vehicle 600 travels backward; (15) an angle threshold for the attitude angle used for removing a travel control intervention in monitoring changes in the wheel load and the angle during the travelling of the vehicle 600; and (16) a wheel load threshold used for removing the travel control intervention in monitoring changes in the wheel load and the angle during the travelling of the vehicle 600

The determination unit 780 executes processing of limiting the speed of the vehicle 600 and processing of limiting the acceleration/deceleration of the vehicle 600 based on the calculated second limit values (activity A410). That is, the determination unit 780 executes travelling processing for the vehicle 600 with the limit values calculated as the second limit values (9) to (16) as the upper limit values.

Next, the determination unit 780 determines whether or not the attitude angle is less than the second limit value (15) and the wheel load exceeds the second limit value (16) (activity A420). When the attitude angle is less than the second limit value (15) and the wheel load exceeds the second limit value (16) (YES in activity A420), the control unit 110 proceeds to processing of activity A380. If the attitude angle is equal to or greater than the second limit value (15) or the wheel load is equal to or less than the second limit value (16) (NO in activity A420), the control unit 110 continues processing of activity A420.

Next, a case where the vehicle 600 is performing the load handling operation will be described. The determination unit 780 determines whether the attitude angle exceeds the first limit value (29) or whether the wheel load is less than the first limit value (30) (activity A430). When the attitude angle exceeds the first limit value (29) or the wheel load is less than the first limit value (30) (YES in activity A430), the control unit 110 proceeds to processing of activity A440. When the attitude angle is equal to or less than the first limit value (29) and the wheel load is equal to or greater than the first limit value (30) (YES in activity A430), the control unit 110 continues processing of activity A430.

Next, the determination unit 780 executes processing to stop the load handling operation, i.e., intervening the load handling operation (activity A440).

Next, the determination unit 780 determines whether the lever for the load handling operation is returned to a neutral position (activity A450). When the lever is returned to the neutral position (YES in activity A450), the control unit 110 proceeds to processing of activity A460. When the lever is not returned to the neutral position (NO in activity A450), the control unit 110 continues processing of activity A450.

Next, the determination unit 780 partially removes the limit on the load handing operation (activity A460). Here, a reverse operation of the operation immediately before executing the stop processing is executable. For example, if the lifting upward stops, only lifting downward can be performed.

Next, the determination unit 780 determines whether or not the attitude angle is less than the first limit value (31) and whether the wheel load exceeds the first limit value (32) (activity A470). When the attitude angle is less than the first limit value (31) and the wheel load exceeds the first limit value (32) (YES in activity A470), the determination unit 780 proceeds to processing of activity A480. When the attitude angle is equal to or greater than the first limit value (31) or the wheel load is equal to or less than the first limit value (32) (NO in activity A470), the determination unit 780 continues processing of activity A470.

Next, the determination unit 780 removes all the limit on the load handling operation (activity A480). Processing of activities A430 to A480 is repeatedly executed while it is determined in activity A370 that "the load handling operation is in progress."

Next, the determination unit 780 determines a load handling mode of the vehicle 600 (lifting in progress, or tilting in progress) (activity A490). When it is determined that lifting is in progress in the vehicle 600, the control unit 110 proceeds to processing of activity A500. When it is determined that tilting is in progress in the vehicle 600, the control unit 110 proceeds to processing of activity A590.

Next, the determination unit 780 determines a lifting mode (moving upward, moving downward, or stopping) of the vehicle 600 (activity A500). When it is determined that the fork 603 of the vehicle 600 is moving upward, the control unit 110 proceeds to processing of activity A510. When it is determined that the fork 603 of the vehicle 600 is moving downward, the control unit 110 continues the processing of activity A500. When it is determined that the fork 603 of the vehicle 600 is stopped, the control unit 110 proceeds to processing of activity A310.

Next, a case where the fork 603 of the vehicle 600 is moving upward will be described. The determination unit 780 determines whether the lifting height exceeds the first limit value (17) (activity A510). When the lifting height exceeds the first limit value (17) (YES in activity A510), the control unit 110 proceeds to processing of activity A520. When the lifting height is equal to or less than the first limit value (17) (NO in activity A510), the control unit 110 continues processing of activity A510.

Next, the determination unit 780 limits the moving up speed of the fork 603 based on the first limit value (19) (activity A520).

The determination unit 780 determines whether the lifting height exceeds the first limit value (18) (activity A530). When the lifting height exceeds the first limit value (18) (YES in activity A530), the determination unit 780 proceeds to processing of activity A540. When the lifting height is equal to or less than the first limit value (18) (NO in activity A530), the determination unit 780 continues processing of activity A530.

Next, the determination unit 780 executes processing to stop the load handling operation, i.e., lifting stop intervention, and processing to prohibit the vehicle 600 from traveling, i.e., travel prohibition (activity A540).

Next, the determination unit 780 determines whether the lever for the load handling operation is returned to the neutral position (activity A550). When the lever is returned to the neutral position (YES in activity A550), the control unit 110 proceeds to processing of activity A560. When the lever is not returned to the neutral position (NO in activity A550), the control unit 110 continues processing of activity A550.

Next, the determination unit 780 partially removes the limit on the load handing operation (activity A560). Here, only the limit for the downward moving operation of the fork 603 is removed.

The determination unit 780 determines whether the lifting height is less than the first limit value (20) (activity A570). When the lifting height is less than the first limit value (20) (YES in activity A570), the control unit 110 proceeds to processing of activity A580. When the lifting height is equal to or greater than the first limit value (20) (NO in activity A570), the control unit 110 continues processing of activity A570.

Next, the determination unit 780 removes all the limits on the load handling operation (activity A580). Then, the control unit 110 proceeds to processing of activity A490.

Next, a case where it is determined that "tilting is in progress" in activity A490 will be described. The determination unit 780 determines the tilt direction of the fork 603 (tilting forward, tilting backward, or stopping) (activity A590). When it is determined that the fork 603 of the vehicle 600 tilts forward, the control unit 110 proceeds to processing of activity A600. When it is determined that the fork 603 of the vehicle 600 tilts backward, the control unit 110 proceeds to processing of activity A680. When it is determined that the fork 603 of the vehicle 600 is stopped, the control unit 110 proceeds to processing of activity A310.

Next, a case where the fork 603 of the vehicle 600 tilts forward will be described. The determination unit 780 determines whether the tilting angle exceeds the first limit value (21) (activity A600). When the tilting angle exceeds the first limit value (21) (YES in activity A600), the control unit 110 proceeds to processing of activity A610. When the tilting angle is equal to or less than the first limit value (21) (NO in activity A600), the control unit 110 continues processing of activity A600.

Next, the determination unit 780 limits the tilting speed of the fork 603 based on the first limit value (23) (activity A610).

Next, the determination unit 780 determines whether the tilting angle exceeds the first limit value (22) (activity A620). When the tilting angle exceeds the first limit value (22) (YES in activity A620), the determination unit 780 proceeds to processing of activity A630. When the tilting angle is equal to or less than the first limit value (22) (NO in activity A620), the determination unit 780 continues processing of activity A620.

Next, the determination unit 780 executes processing to stop the load handling operation, i.e., tiling stop intervention and processing to prohibit the vehicle 600 from traveling, i.e., travel prohibition (activity A630).

Next, the determination unit 780 determines whether the lever for the load handling operation is returned to the neutral position (activity A640). When the lever is returned to the neutral position (YES in activity A640), the control unit 110 proceeds to processing of activity A650. When the lever is not returned to the neutral position (NO in activity A640), the control unit 110 continues processing of activity A640.

Next, the determination unit 780 partially removes the limit on the load handing operation (activity A650). Here, only the limit for the backward tilting operation of the fork 603 is removed.

The determination unit 780 determines whether the tilting angle is less than the first limit value (24) (activity A660). When the tilting angle is less than the first limit value (24) (YES in activity A660), the control unit 110 proceeds to processing of activity A670. When the tilting angle is equal to or greater than the first limit value (24) (NO in activity A660), the control unit 110 continues processing of activity A660.

Next, the determination unit 780 removes all the limits on the load handling operation (activity A670). Then, the control unit 110 proceeds to processing of activity A370.

Next, a case where the fork 603 of the vehicle 600 tilts backward will be described. The determination unit 780 determines whether the tilting angle exceeds the first limit value (25) (activity A680). When the tilting angle exceeds the first limit value (25) (YES in activity A680), the control unit 110 proceeds to processing of activity A690. When the tilting angle is equal to or less than the first limit value (25) (NO in activity A680), the control unit 110 continues processing of activity A680.

Next, the determination unit 780 limits the tilting speed of the fork 603 based on the first limit value (27) (activity A690).

The determination unit 780 determines whether the tilting angle exceeds the first limit value (26) (activity A700). When the tilting angle exceeds the first limit value (26) (YES in activity A700), the control unit 110 proceeds to processing of activity A710. When the tilting angle is equal to or less than the first limit value (26) (NO in activity A700), the control unit 110 continues processing of activity A700.

Next, the determination unit 780 executes processing to stop the load handling operation and processing to prohibit the vehicle 600 from traveling (activity A710).

Next, the determination unit 780 determines whether the lever for the load handling operation is returned to the neutral position (activity A720). When the lever is returned to the neutral position (YES in activity A720), the control unit 110 proceeds to processing of activity A730. When the lever is not returned to the neutral position (NO in activity A720), the control unit 110 continues processing of activity A720.

Next, the determination unit 780 partially removes the limit on the load handling operation (activity A730). Here, only the limit for the forward tilting operation of the fork 603 is removed.

The determination unit 780 determines whether the tilting angle is less than the first limit value (28) (activity A740). When the tilting angle is less than the first limit value (28) (YES in activity A740), the control unit 110 proceeds to processing of activity A750. When the tilting angle is equal to or greater than the first limit value (28) (NO in activity A740), the control unit 110 continues processing of activity A740.

Next, the determination unit 780 removes all the limits for the load handling operation (activity A750). Then, the control unit 110 proceeds to processing of activity A370.

As described above, using the wheel load estimation device 100 in a forklift secures the stability and workability of the forklift truck.

In other words, the vehicle 600 of the fourth embodiment is provided with the wheel load estimation device 100, the determination unit 780 having the function of a limiting unit, and the operation unit 720 (operation amount detection unit). The wheel load estimation device 100 outputs the estimated wheel loads. The operation unit 720 detects the operation amount of the fork 603. The determination unit 780 determines whether limiting the motion of the vehicle 600 is necessary based on the estimated wheel loads, the detected operation amount, and the reference information. The reference information is information indicating the relationship among the estimated wheel load, the detected operation amount, and whether limiting the motion of the vehicle 600 is necessary. The determination unit 780 (the limiting unit) limits the motion of the vehicle 600 when it is determined that the motion of the vehicle 600 needs to be limited.

Although the embodiments of the present disclosure have been described above, the present disclosure is not limited to these, but may be modified as appropriate without departing from the technical concept of the disclosure.

Section 16. Modifications

In Section 16, modifications of the present embodiments will be described.

An aspect of the present embodiments may be a program. This program causes a computer to function as various units of the wheel load estimation device 100.

An aspect of the present embodiments may be a wheel load estimation method. This wheel load estimation method includes processing executed by the various units of the wheel load estimation device 100 as steps.

The control unit 110 executes writing processing (storing processing) and reading out processing for various data and information in the storage unit 120, but such processing is not limited to this. For example, information processing for each activity may be executed using a register or cache memory within the control unit 110.

The acceleration used in the present embodiments may be the acceleration of the vehicle 600 in the three axial directions.

In activities A140 and A150, both the angular velocity and angular acceleration around the three axes of the vehicle 600 are acquired, but this is not a limitation. The acquisition unit only has to acquire at least one of the angular velocity and angular acceleration around the three axes of the vehicle 600.

In activity A190, the wheel loads are estimated based on the inertia value related to the inertia at the position of the center of gravity, at least one of the angular velocity and the angular acceleration, the inertial force generated on the vehicle 600, and the predetermined estimation equation, but the present embodiment is not limited to this. The estimation unit only needs to estimate the wheel load acting on each wheel of the vehicle 600 based on at least the moment acting on the vehicle 600 and a predetermined estimation equation.

In the present embodiments, the case where the lifting height is acquired from the rotation angle of the lifting hydraulic motor detected by the encoder 400 has been described, but acquisition of the lifting height is not limited to this. For example, a wire may be provided on the fork 603, and the lifting height may be acquired by measuring the change in length of the wire during the load handling operation. Furthermore, other values acquired by the acquisition unit are not limited to the case of being acquired by the methods of the above-described embodiments, but may be acquired by other methods.

In the present embodiments, the case in which the wheel load estimation device 100 is mounted on the vehicle 600 has been described, but a position of the wheel load estimation device 100 is not limited to this. The wheel load estimation device 100 may be configured as an external device. In this case, the vehicle 600 may be provided with a communication unit that transmits the detection values of the IMU 200, the pressure sensor 300, the encoder 400, and the operation amount sensor 500 to the wheel load estimation device 100, and the wheel load estimation device 100 as an external device may acquire various pieces of information transmitted from the communication unit of the vehicle 600 and estimate the wheel load by processing similar to that in the above embodiments.

In the fourth embodiment, the determination unit 780 has been described as having the functions of both the "determination unit" and the "limiting unit" as described in claims, but the configuration is not limited to this. The vehicle 600 may further include a functional unit equivalent to the "limiting unit" in addition to the determination unit 780.

Section 17. Others

The present disclosure may be provided in any of the following manners.

(1) A wheel load estimation device that estimates a wheel load acting on a wheel of a vehicle, the wheel load estimation device comprising: an acquisition unit, a calculation unit, and an estimation unit, wherein the acquisition unit acquires a detection value output from a sensor as a parameter, the parameter is a parameter related to a motion of the vehicle, the calculation unit calculates an inertial force generated in the vehicle based on the parameter and a mass of the vehicle, the estimation unit estimates the wheel load based on the inertial force and a predetermined estimation equation.

According to this aspect, it is possible to reduce a calculation load in estimating the wheel loads, as compared to conventional devices. As a result, saved resources can be used for other core functions.

(2) The wheel load estimation device according to (1), wherein the parameter includes an acceleration of the vehicle and at least one of the angular velocity and an angular acceleration about three axes of the vehicle.

According to this aspect, the detection values output from the IMU can be effectively utilized, and the wheel load estimation logic for a flat road can be used for a slope as well.

(3) The wheel load estimation device according to (2), wherein the acceleration is an acceleration in three axial directions of the vehicle.

According to this aspect, by using the acceleration of the vehicle in the three axial directions, the wheel loads when the vehicle travels on the slope can be accurately estimated.

(4) The wheel load estimation device according to (1), wherein the parameter includes at least one of a wheel speed and a first wheel acceleration of the vehicle, at least one of an angular velocity and an angular acceleration about a pitch axis of the vehicle, and an attitude angle of the vehicle about the pitch axis of the vehicle.

According to this aspect, the detection values output from the wheel speed sensor can be effectively utilized, and the wheel load estimation logic for the flat road can be used for the slope as well.

(5) The wheel load estimation device according to (4), wherein the parameter includes the first wheel acceleration, the calculation unit calculates a second wheel acceleration by correcting the first wheel acceleration based on the first wheel acceleration and the attitude angle, the calculation unit calculates the inertial force based on the second wheel acceleration and the mass.

According to this aspect, by executing correction processing specific to when the vehicle travels on the slope, the wheel load when the vehicle travels on the slope can be estimated with high accuracy.

(6) The wheel load estimation device according to (5), wherein the second wheel acceleration is obtained by correcting the first wheel acceleration with a directional component based on an inclination direction of the vehicle calculated from the parameter and a gravitational acceleration applied to the first wheel acceleration.

According to this aspect, by executing correction processing specific to when the vehicle travels on the slope, the wheel load when the vehicle travels on the slope can be estimated with high accuracy.

(7) The wheel load estimation device according to any one of (1) to (6), wherein the calculation unit calculates a position of a center of gravity of the vehicle, the calculation unit calculates an inertia value relating to an inertia at the position of the center of gravity of the vehicle from the position of the center of gravity of the vehicle and the mass of the vehicle, the estimation unit estimates the wheel load based on the inertia value, the inertial force, and the estimation equation.

According to this aspect, by using the inertia tensor of the vehicle, the wheel loads when the vehicle travels on the slope can be estimated with higher accuracy.

(8) The wheel load estimation device according to any one of (1) to (7), wherein the acquisition unit continuously acquires the parameter, the calculation unit continuously calculates the inertial force based on the continuously acquired parameter and the mass of the vehicle, the estimation unit continuously estimates the wheel load in time series based on the continuously calculated inertial force and the estimation equation.

According to this aspect, the wheel loads can be estimated continuously in time series.

(9) A vehicle including the wheel load estimation device according to any one of (1) to (8), the vehicle comprising, a determination unit, and a limiting unit, wherein the wheel load estimation device outputs the estimated wheel load, the determination unit determines whether limiting a motion of the vehicle is necessary based on the estimated wheel load and reference information, the reference information is information indicating a relationship between the estimated wheel load and whether limiting the motion of the vehicle is necessary, the limiting unit limits the motion of the vehicle when the determination unit determines that limiting the motion of the vehicle is necessary.

According to this aspect, it is possible to achieve both vehicle stability and workability using the wheel load estimation device.

(10) The vehicle according to (9), further comprising a fork, wherein the vehicle is a forklift truck.

According to this aspect, the wheel load estimation device can be suitably mounted on a forklift truck.

(11) The vehicle according to (10), further comprising an operation amount detection unit, wherein the operation amount detection unit detects an operation amount of the fork, the determination unit determines whether limiting the motion of the vehicle is necessary, based on the estimated wheel load, the detected operation amount, and the reference information, the reference information is information indicating a relationship between the estimated wheel load, the operation amount, and whether limiting a motion of the vehicle is necessary, and the limiting unit limits the motion of the vehicle when the determination unit determines that limiting the motion of the vehicle is necessary.

According to this aspect, it is possible to achieve both vehicle stability and workability using the wheel load estimation device.

A program causing a computer to function as units of the wheel load estimation device according to any one of (1) to (8).

According to this aspect, it is possible to reduce a calculation load in estimating the wheel loads, as compared to conventional devices. As a result, saved resources can be used for other core functions.

A wheel load estimation method, comprising, as each step, a process executed by units of the wheel load estimation device according to any one of (1) to (8) above.

According to this aspect, it is possible to reduce a calculation load in estimating the wheel loads, as compared to conventional devices. As a result, saved resources can be used for other core functions.

It is noted that the present disclosure is not limited to the above.

What is claimed is:

1. A vehicle comprising:
a wheel load estimation device that estimates a longitudinal force (Xv) as a wheel load acting on a wheel of the vehicle when traveling straight downhill on a slope, the wheel load estimation device including at least one sensor configured to output detection values including an acceleration (Sx) in a forward/rearward traveling direction of the vehicle, angular velocities (P, Q, R), and angular accelerations ($\dot{P}$, $\dot{Q}$, $\dot{R}$) about axes along the forward/rearward traveling direction, a lateral direction, and a vertical direction of the vehicle; and
at least one processor configured to:
acquire the detection values output from the at least one sensor as parameters related to a motion of the vehicle,
acquire a longitudinal acceleration ($S_{xCG}$) at a center of gravity ($CG_{all}$) of the vehicle using the detection values,
estimate the wheel load based on a product of a mass ($M_{all}$) of the vehicle and the longitudinal acceleration ($S_{xCG}$) at the center of gravity ($CG_{all}$) of the vehicle,
determine whether limiting a motion of the vehicle is necessary based on the estimated wheel load and reference information, the reference information being information indicating a relationship between the estimated wheel load and whether limiting the motion of the vehicle is necessary; and
based upon the determination that limiting the motion of the vehicle is necessary, limit at least one of: a traveling speed of the vehicle, an acceleration of the vehicle, a deceleration of the vehicle, a lifting speed of a fork of the vehicle, a tilting speed of the fork, a load handling operation of the vehicle, or traveling of the vehicle.

2. The vehicle according to claim 1, wherein
the parameters further include a lateral acceleration of the vehicle and a vertical acceleration of the vehicle.

3. The vehicle according to claim 2, wherein
the acceleration in the forward/rearward traveling direction, the lateral acceleration, and the vertical acceleration constitute accelerations is an acceleration in three axial directions of the vehicle, the at least one processor is further configured to:

calculate a position of a center of gravity of the vehicle, calculate an inertia value relating to an inertia at the position of the center of gravity of the vehicle based on the position of the center of gravity of the vehicle and the mass of the vehicle, and estimate the wheel load based on the inertia value, an inertial force, and a predetermined estimation equation.

4. The vehicle according to claim 1, wherein the parameters further include at least one of a wheel speed and a first wheel acceleration of the vehicle, at least one of an angular velocity and an angular acceleration about a pitch axis of the vehicle, and an attitude angle of the vehicle about the pitch axis of the vehicle.

5. The vehicle according to claim 4, wherein the parameters include the first wheel acceleration, the at least one processor calculates a second wheel acceleration by correcting the first wheel acceleration based on the first wheel acceleration and the attitude angle, and calculates an inertial force based on the second wheel acceleration and the mass.

6. The vehicle according to claim 5, wherein the second wheel acceleration is obtained by correcting the first wheel acceleration with a directional component based on an inclination direction of the vehicle calculated from the parameters and a gravitational acceleration applied to the first wheel acceleration.

7. The vehicle according to claim 1, wherein the at least one processor is further configured to:

calculate a position of a center of gravity of the vehicle, calculate an inertia value relating to an inertia at the position of the center of gravity of the vehicle based on the position of the center of gravity of the vehicle and the mass of the vehicle, and estimate the wheel load based on the inertia value, an inertial force, and a predetermined estimation equation.

8. The vehicle according to claim 1, wherein the at least one processor is further configured to:

continuously acquire the parameters, continuously calculate an inertial force based on the continuously acquired parameters and the mass of the vehicle, and continuously estimate the wheel load in time series based on the continuously calculated inertial force and a predetermined estimation equation.

9. The vehicle according to claim 1, further comprising a fork, wherein the vehicle is a forklift truck.

10. The vehicle according to claim 9, further comprising at least one sensor configured to detect an operation amount of the fork, wherein the at least one processor is further configured to determine whether limiting the motion of the vehicle is necessary, based on the estimated wheel load, the detected operation amount, and the reference information, the reference information is information indicating a relationship among the estimated wheel load, the operation amount, and whether limiting a motion of the vehicle is necessary.

11. A non-transitory computer-readable storage medium storing a program for causing a computer to execute processing comprising:

acquiring a detection value output from at least one sensor as a parameter, the parameter being related to a motion of a vehicle, the at least one sensor being configured to output detection values including an acceleration (Sx) in a forward/rearward traveling direction of the vehicle, angular velocities (P, Q, R), and angular accelerations ($\dot{P}$, $\dot{Q}$, $\dot{R}$) about axes along the forward/rearward traveling direction, a lateral direction, and a vertical direction of the vehicle;

acquiring a longitudinal acceleration ($S_{xCG}$) at a center of gravity ($CG_{all}$) of the vehicle using the detection values;

estimating a longitudinal force as acting on a wheel of the vehicle when traveling straight downhill on a slope, based on a product of a mass ($M_{all}$) of the vehicle and the longitudinal acceleration ($S_{xCG}$) at the center of gravity ($CG_{all}$) of the vehicle;

determining whether limiting a motion of the vehicle is necessary based on the estimated wheel load and reference information, the reference information being information indicating a relationship between the estimated wheel load and whether limiting the motion of the vehicle is necessary; and based upon the determination that limiting the motion of the vehicle is necessary, limiting at least one of: a traveling speed of the vehicle, an acceleration of the vehicle, a deceleration of the vehicle, a lifting speed of a fork of the vehicle, a tilting speed of the fork, a load handling operation of the vehicle, or traveling of the vehicle.

12. A wheel load estimation method comprising:

acquiring a detection value output from at least one sensor as a parameter, the parameter being related to a motion of a vehicle, the at least one sensor being configured to output detection values including an acceleration (Sx) in a forward/rearward traveling direction of the vehicle, angular velocities (P, Q, R), and angular accelerations ($\dot{P}$, $\dot{Q}$, $\dot{R}$) about axes along the forward/rearward traveling direction, a lateral direction, and a vertical direction of the vehicle;

acquiring a longitudinal acceleration ($S_{xCG}$) at a center of gravity ($CG_{all}$) of the vehicle using the detection values;

estimating a longitudinal force as acting on a wheel of the vehicle when traveling straight downhill on a slope, based on a product of a mass ($M_{all}$) of the vehicle and the longitudinal acceleration ($S_{xCG}$) at the center of gravity ($CG_{all}$) of the vehicle;

determining whether limiting a motion of the vehicle is necessary based on the estimated wheel load and reference information, the reference information being information indicating a relationship between the estimated wheel load and whether limiting the motion of the vehicle is necessary; and based upon the determination that limiting the motion of the vehicle is necessary, limiting at least one of: a traveling speed of the vehicle, an acceleration of the vehicle, a deceleration of the vehicle, a lifting speed of a fork of the vehicle, a tilting speed of the fork, a load handling operation of the vehicle, or traveling of the vehicle.

* * * * *